(12) United States Patent
Müller et al.

(10) Patent No.: US 10,179,835 B2
(45) Date of Patent: Jan. 15, 2019

(54) RADICAL CROSSLINKING OF POLYETHER CARBONATE POLYOLS THAT HAVE ELECTRON-POOR AND ELECTRON-RICH DOUBLE BONDS

(71) Applicant: Covestro Deutschland AG, Leverkusen (DE)

(72) Inventors: Thomas E. Müller, Aachen (DE); Christoph Gürtler, Köln (DE); Muhammad A. Subhani, Aachen (DE); Burkhard Köhler, Zierenberg (DE); Walter Leitner, Aachen (DE)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 190 days.

(21) Appl. No.: 14/914,308

(22) PCT Filed: Sep. 2, 2014

(86) PCT No.: PCT/EP2014/068583
§ 371 (c)(1),
(2) Date: Feb. 25, 2016

(87) PCT Pub. No.: WO2015/032737
PCT Pub. Date: Mar. 12, 2015

(65) Prior Publication Data
US 2016/0200865 A1    Jul. 14, 2016

(30) Foreign Application Priority Data

Sep. 5, 2013 (EP) .................................. 13183208

(51) Int. Cl.
| | | |
|---|---|---|
| *C08G 64/34* | (2006.01) | |
| *C08G 64/42* | (2006.01) | |
| *C08L 69/00* | (2006.01) | |
| *C09D 169/00* | (2006.01) | |
| *C09J 169/00* | (2006.01) | |
| *C08G 64/18* | (2006.01) | |
| *C08G 65/26* | (2006.01) | |

(52) U.S. Cl.
CPC ........... *C08G 64/34* (2013.01); *C08G 64/183* (2013.01); *C08G 64/42* (2013.01); *C08G 65/2603* (2013.01); *C08G 65/2663* (2013.01); *C08L 69/00* (2013.01); *C09D 169/00* (2013.01); *C09J 169/00* (2013.01)

(58) Field of Classification Search
CPC ...... C08G 64/183; C08G 64/34; C08G 64/42; C08G 65/2603; C08G 65/2663; C08L 69/00; C09D 169/00; C09J 169/00
USPC ........................................................ 523/400
See application file for complete search history.

(56) References Cited

U.S. PATENT DOCUMENTS

| | | | |
|---|---|---|---|
| 3,404,109 A | 10/1968 | Milgrom | |
| 3,829,505 A | 8/1974 | Herold | |
| 3,941,849 A | 3/1976 | Herold | |
| 5,158,922 A | 10/1992 | Hinney et al. | |
| 5,470,813 A | 11/1995 | Le-Khac | |
| 6,767,986 B2 | 7/2004 | Moethrath et al. | |
| 6,780,813 B1 | 8/2004 | Hofmann et al. | |
| 6,835,687 B2 | 12/2004 | Hofmann et al. | |
| 7,008,900 B1 | 3/2006 | Hofmann et al. | |
| 2008/0021154 A1* | 1/2008 | Haider ................ | C08G 64/183 525/54.2 |
| 2010/0048935 A1* | 2/2010 | Mijolovic .......... | C08G 64/0208 558/276 |
| 2012/0172537 A1* | 7/2012 | Arai .................... | C08G 18/4866 525/415 |
| 2014/0323670 A1 | 10/2014 | Müller et al. | |
| 2014/0329987 A1 | 11/2014 | Gürtler et al. | |

FOREIGN PATENT DOCUMENTS

| | | |
|---|---|---|
| EP | 0700949 A2 | 3/1996 |
| EP | 0743093 A1 | 11/1996 |
| EP | 0761708 A2 | 3/1997 |

(Continued)

OTHER PUBLICATIONS

Tao et al., "Crosslinkable Poly(propylene carbonate): High-Yield Synthesis and Preformance Improvement", Journal of Polymer Science: Part A: Polymer Chemistry, pp. 5329-5336 (2006).
Byrne et al., "Alternating Copolymerization of Limonene Oxide and Carbon Dioxide", J. Am. Chem. Soc., vol. 126, pp. 11404-11405 (2004).
International Search Report for PCT/EP2014/068583 dated Feb. 6, 2015.

*Primary Examiner* — David T Karst
(74) *Attorney, Agent, or Firm* — K&L Gates LLP

(57) ABSTRACT

The present invention relates to a method for producing polyether carbonate polyols, the polyether carbonate polyols having electron-poor and electron-rich double bonds, said method preferably comprising the steps of (a) providing a suspending agent and/or an H-functional starter compound and a DMC catalyst, 03) adding at least one epoxide and (y) adding carbon dioxide, an epoxide that does not contain an unsaturated group, and at least two unsaturated compounds, the unsaturated compounds in method step (y) being selected from the group comprising unsaturated epoxides and unsaturated cyclic anhydrides, and one of the unsaturated compounds having an electron-rich double bond and one of the unsaturated compounds having an electron-poor double bond. The invention also relates to the crosslinking of polyether carbonate polyols, the polyether carbonate polyols having electronpoor and electron-rich double bonds, and to the crosslinked polyether carbonates obtainable therefrom.

9 Claims, No Drawings

(56) References Cited

FOREIGN PATENT DOCUMENTS

| | | |
|---|---|---|
| EP | 1359177 A1 | 11/2003 |
| EP | 2604641 A1 | 6/2013 |
| EP | 2604642 A1 | 6/2013 |
| JP | 4145123 B2 | 9/2008 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-01/80994 A1 | 11/2001 |
| WO | WO-2010028362 A1 | 3/2010 |
| WO | WO-2013016331 A2 | 1/2013 |

* cited by examiner

RADICAL CROSSLINKING OF POLYETHER CARBONATE POLYOLS THAT HAVE ELECTRON-POOR AND ELECTRON-RICH DOUBLE BONDS

CROSS-REFERENCE TO RELATED APPLICATIONS

This application is a national stage application (under 35 U.S.C. § 371) of PCT/EP2014/068583, filed Sep. 2, 2014, which claims benefit of European Application No. 13183208.1, filed Sep. 5, 2013, both of which are incorporated herein by reference in their entirety.

The present invention relates to a process for preparing polyethercarbonate polyols, the polyethercarbonate polyols containing electron-poor and electron-rich double bonds, comprising the steps of (α) initially introducing an H-functional starter compound and a catalyst and (γ) metering in carbon dioxide and two unsaturated compounds, the unsaturated compounds from process step (γ) being selected from the group encompassing unsaturated epoxides and unsaturated cyclic anhydrides, and one of the unsaturated compounds having an electron-rich double bond and one of the unsaturated compounds having an electron-poor double bond. The invention further relates to the crosslinking of polyethercarbonate polyols containing electron-poor and electron-rich double bonds, and also to the crosslinked polyethercarbonates obtainable therefrom.

BACKGROUND OF THE INVENTION

As well as having a tailored functionality, modern plastics are also intended to do increased justice to environmental concerns. As well as by a general optimization of preparation processes, this can also be achieved through the use of greenhouse gases, such as carbon dioxide, as building blocks for the synthesis of polymers. Accordingly, for example, a better environmental balance for the process can be obtained overall via the fixing of carbon dioxide. This path is being followed in the area of the production of polyethercarbonates, and has been a topic of intense research for more than 40 years (e.g., Inoue et al, Copolymerization of Carbon Dioxide and Alkylenoxide with Organometallic Compounds; Die Makromolekulare Chemie 130, 210-220, 1969). In one possible preparation variant, polyethercarbonate polyols are obtained by a catalytic reaction of epoxides and carbon dioxide in the presence of H-functional starter substances ("starters"). A general reaction equation for this is given in scheme (I):

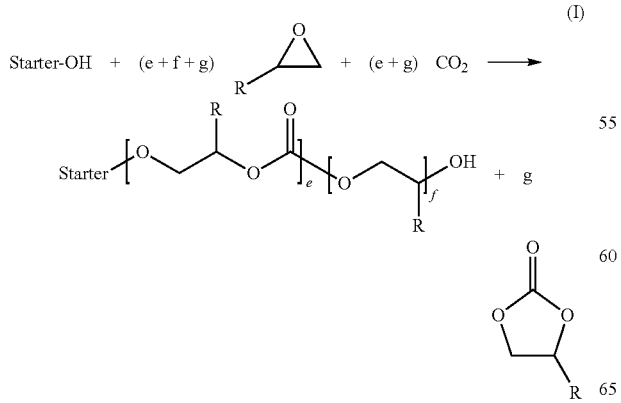

A further product, in this case an unwanted byproduct, arising alongside the polythercarbonate is a cyclic carbonate (for example, for R=CH$_3$, propylene carbonate).

As shown above, polyethercarbonate polyols have OH-functionalities, and this makes it possible in principle for relatively high molecular mass crosslinking products to be produced in further reactions, as by the addition of diisocyanates or polyisocyanates, for example. It would, however, be desirable to establish still further possibilities for the functionalization of the polymer scaffold, such possibilities being amenable to utilization in reactions including subsequent crosslinking reactions. One possibility for this is afforded by the copolymerization of monomers containing unsaturated groups which are able subsequently to act as functional groups.

EP A 2604641 discloses a process for preparing polyetherestercarbonate polyols by catalytic addition of carbon dioxide, alkylene oxides and cyclic anhydrides onto H-functional starter substances in the presence of double metal cyanide (DMC) catalysts.

EP-A 2604642 discloses a process for preparing polyethercarbonate polyols by catalytic addition of carbon dioxide and alkylene oxides onto H-functional starter substances in the presence of DMC catalyst which has been activated in the presence of cyclic anhydride.

The publication J. Polym. Sci. Part A (2006) 44(18) 5329-5336 describes polycarbonates prepared from alkylene oxide, allyl glycidyl ether and CO$_2$ using ternary rare-earth catalysts (glycerol and diethylzinc modified with Y salts). The epoxide-CO$_2$ copolymerization produces virtually alternating polymers.

The publication Journal American Chemical Society (2004) 126 11404-11405 describes the alternating copolymerization of limonene oxide and CO$_2$. Zinc β-diiminates are used as catalysts.

WO-A 2013/016331 discloses formulations for producing polyurethanes and also the polyurethanes produced accordingly (such as foams, TPUs, and elastomers) based on aliphatic polycarbonate polyols having an alternating carbonate-alkylene oxide structure.

WO-A 2010/028362 discloses the preparation of predominantly alternating polycarbonate polyols by reaction of epoxides with CO$_2$ with catalysis by metal complexes, typically Co(III)-salen complexes, and optionally co-catalysts, in the presence of protic chain transfer agents, preferably diols, such as low molecular mass diols and hydroxy-functional polyesters and polyethers.

Polymer (2006) 47, 8453-8461 and, J. Polymer Research (2009) 16, 91-97, disclose the terpolymerization of alkylene oxides with maleic anhydride and CO$_2$ in the presence of polymer-supported double metal catalysts or supported zinc glutarate catalysts. Characteristics described include the increase in the glass transition temperature through the incorporation of the anhydride, and the crosslinking with dicumyl peroxide at 170° C. over several minutes. The increased glass transition temperature and the associated increased viscosity hinder the processing of the resulting products. For many applications, the curing temperatures are too high and the curing times too long.

Journal of Polymer Science Part A: Polymer Chemistry (2006) 44 (18) 5329-5336 describes terpolymers of propylene oxide, allyl glycidyl ether, and CO$_2$ which can be crosslinked by UV radiation. For many applications, however, this specific mode of curing is too slow.

BRIEF SUMMARY OF THE INVENTION

The object is therefore to provide a process for the specific functionalization of polyethercarbonate polyols and, furthermore, to show a route via which these polyethercarbonate polyols can be crosslinked to form assemblies of higher molecular mass.

The object is achieved in accordance with the invention by a process for preparing polyethercarbonate polyols, the polyethercarbonate polyols comprising double bonds, comprising the steps of:

(α) initially introducing a catalyst and
  (αα) a suspension medium which contains no H-functional groups and/or
  (αβ) an H-functional starter compound
(γ) metering in carbon dioxide, an epoxide which contains no unsaturated group, and at least two unsaturated compounds, where the unsaturated compounds metered in step (γ) are selected from the group of the unsaturated epoxides and/or unsaturated cyclic anhydrides, and (γ1) one of the unsaturated compounds comprises a double bond comprising at least one substituent selected from the group of $-OX^1$, $-OCOX^1$, $-X^1$, $-CH_2OX^1$ and/or $-CH=CHX^1$, where $X^1$ in each case is substituted or unsubstituted alkyl, substituted or unsubstituted cycloalkyl, substituted or unsubstituted aryl or a substituted or unsubstituted methylene chain;

(γ2) and another of the unsaturated compounds comprises a double bond comprising at least one substituent selected from the group of $-F$, $-Cl$, $-Br$, $-I$, $-COH$, $-COX^2$, $-COOX^2$, $-C\equiv N$ and/or $-NO_2$ or is an unsaturated, substituted or unsubstituted cyclic anhydride of an organic dicarboxylic acid, where $X^2$ in each case is substituted or unsubstituted alkyl, substituted or unsubstituted cycloalkyl, substituted or unsubstituted aryl or a substituted or unsubstituted methylene chain and where additionally, if no H-functional starter compound is introduced in step (α), step (γ) comprises the metering in of an H-functional starter compound.

Surprisingly it has been found that through the choice of at least two different unsaturated compounds in the synthesis of the polyethercarbonate polyol, with one of the compounds having an electron-rich double bond and the other compound having an electron-poor double bond, it is possible to obtain polyethercarbonate polyols with unsaturated groups which have particularly favorable properties in comparison to the prior art.

DETAILED DESCRIPTION OF THE INVENTION

The polyethercarbonate polyols of the invention containing unsaturated groups can be obtained reproducibly in a high yield and, as a result of the selected process regime, have a narrow molecular mass distribution and only a very small fraction of unreacted monomers. Furthermore, the polyethercarbonate polyols with unsaturated groups that are obtainable via this process can be radically crosslinked with particular advantage, and so lead to crosslinked polyethercarbonates having advantageous properties and easy processing.

Without wishing to be bound by a theory, this easy processing in the context of the crosslinking comes about through the difference in reactivity of the double bonds of the polyethercarbonate polyol within the radical reaction. This is in contrast to radical reactions where participants are polyethercarbonate polyols which have only double bonds of one electron density.

The unsaturated compounds in this case may carry the electron-withdrawing or electron-donating substituents, for example, alternatively directly on, adjacent to or, optionally, in allyl position to the double bond.

In the polyethercarbonate polyols which can be prepared by the process of the invention, the double bonds may be present in the main chain and/or in the side chains.

Where not otherwise indicated, the term "double bond" in the context of the present invention means a C=C double bond.

Substituents as per (γ1) may contribute to an increase in the electron density of the double bond. Accordingly, electron-rich double bonds are obtained. Electron-rich double bonds in the sense of the invention, then, are those which are more electron-rich than ethylene, in other words those which are substituted by +M or +I substituents. The comments made above apply accordingly, with the proviso that the substituents are capable of raising the electron density through mesomeric or inductive effects in the double bond.

Substituents as per (γ2) may contribute to a reduction in the electron density of the double bond. Accordingly, electron-poor double bonds are obtained. Electron-poor double bonds in the sense of the invention are therefore those which are more electron-poor than ethylene, i.e., those which are substituted by –M or –I substituents. Substituents with a –M effect are capable of distributing electron density by mesomeric charge delocalization from the double bond onto the substituents. Substituents having a –I effect are capable of reducing the electron density in the double bond through an inductive effect.

In the case both of the substituents as per (γ1) and of the substituents as per (γ2), the term "substituted methylene chain" includes the possibility of the methylene chain containing an epoxide group. One example of this is allyl glycidyl ether, in which the double bond is substituted by $-CH_2OX^1$ and $X^1$ may be described as a 1,2-oxo-substituted methylene chain. Further examples are butadiene monoepoxide and isoprene monoepoxide.

The term "substituted cycloalkyl" also includes the possibility of the cycloalkyl unit containing an epoxide group, as is the case for vinylcyclohexene oxide, for example. It is possible, moreover, for the double bond, through 1,2-substitution, to be part of an epoxy-substituted cycloalkyl ring, as is the case in compounds such as, for instance, cyclooctadiene monoepoxide.

Where there are two or more substituents with different electronic and/or mesomeric contributions, the overall contribution of the substituents, and hence the classification as an electron-rich or electron-poor double bond, may be made using quantum-mechanical calculations. Alternatively it is also possible to determine the reaction rate of an electrophilic substitution at this double bond, and to compare it with that of an unsubstituted double bond. Higher reaction rates indicate a more electron-rich double bond, lower reaction rates a more electron-poor double bond.

Without wishing to be tied by the theory, the substitution of the invention leads to a change in the HOMO/LUMO level of the double bonds involved, which facilitates a subsequent reaction, by a radical crosslinking, for example.

In the process of the invention, monomers without unsaturated groups that can be employed are epoxides having 2-45 carbon atoms and carrying no double bond. The epoxides having 2-45 carbon atoms are, for example, one or more compounds selected from the group encompassing ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-buteneoxide, epoxides of C6-C22 α-olefins, such as 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, I-octene oxide, 1-nonene oxide, 1-decene oxide, 1-undecene oxide, 1-dodecene oxide, 4-methyl-1,2-pentene oxide, cyclopentene oxide, cyclohexene oxide, cycloheptene oxide, cyclooctene oxide, styrene oxide, methylstyrene oxide, pinene oxide, singly or multiply epoxidized fats as mono-, di- and triglycerides, epoxidized fatty acids, C1-C24 esters of epoxidized fatty acids, epichlorohydrin, glycidol, and derivatives of glycidol such as, for example, glycidyl ethers of C1-C22 alkanols and glycidyl esters of C1-C22 alkanecarboxylic acids. Examples of derivatives of glycidol are phenyl glycidyl ether, cresyl glycidyl ether, methyl glycidyl ether, ethyl glycidyl ether and 2-ethylhexyl glycidyl ether. As epoxides it is possible with preference to use ethylene oxide and/or propylene oxide, especially propylene oxide.

For the preparation of the polyethercarbonate polyols of the invention containing electron-rich and electron-poor double bonds, furthermore, an H-functional starter compound is used.

The suspension media which are used in step ($\alpha$) for suspending the catalyst contain no H-functional groups. Suitable suspension media are all polar aprotic, weakly polar aprotic and nonpolar aprotic solvents, none of which contain any H-functional groups. As suspension medium it is also possible to use a mixture of two or more of these suspension media. The following polar aprotic solvents are mentioned here by way of example: 4-methyl-2-oxo-1,3-dioxolane (also referred to below as cyclic propylene carbonate), 1,3-dioxolan-2-one, acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

In one alternative embodiment, suspension media used in step ($\alpha$) for suspending the catalyst are one or more compounds selected from the group consisting of aliphatic lactones, aromatic lactones, lactides, cyclic carbonates having at least three optionally substituted methylene groups between the oxygen atoms of the carbonate group, aliphatic cyclic anhydrides, and aromatic cyclic anhydrides. Without being tied to a theory, suspension media of this kind are incorporated into the polymer chain in the subsequent course of the ongoing polymerization in the presence of a starter. As a result, there is no need for downstream purification steps.

Aliphatic or aromatic lactones are cyclic compounds containing an ester bond in the ring. Preferred compounds are 4-membered-ring lactones such as β-propiolactone, β-butyrolactone, β-isovalerolactone, β-caprolactone, β-isocaprolactone, β-methyl-β-valerolactone, 5-membered-ring lactones, such as γ-butyrolactone, γ-valerolactone, 5-methylfuran-2(3H)-one, 5-methylidenedihydmrfuran-2(3H)-one, 5-hydroxyfuran-2(5H)-one, 2-benzofuran-1(3H)-one and 6-methyl-2-benzofuran-1(3H)-one, 6-membered-ring lactones, such as δ-valerolactone, 1,4-dioxan-2-one, dihydrocoumarin, 1H-isochromen-1-one, 8H-pyrano[3,4-b]pyridin-8-one, 1,4-dihydro-3H-isochromen-3-one, 7,8-dihydro-5H-pyrano[4,3-b]pyridin-5-one, 4-methyl-3,4-dihydro-1H-pyrano[3,4-b]pyridin-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered-ring lactones, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, and lactones with higher numbers of ring members, such as (7E)-oxacycloheptadec-7-en-2-one.

Lactides are cyclic compounds containing two or more ester bonds in the ring. Preferred compounds are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-dione, 3,6-di(but-3-en-1-yl)-1,4-dioxane-2,5-dione (in each case inclusive of optically active forms). Particular preference is given to L-lactide.

Cyclic carbonates used are preferably compounds having at least three optionally substituted methylene groups between the oxygen atoms of the carbonate group. Preferred compounds are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5-dipropyl-1,3-dioxan-2-one. Particular preference is given to trimethylene carbonate and neopentyl glycol carbonate.

Under the conditions of the process of the invention for the copolymerization of epoxides and $CO_2$, cyclic carbonates having fewer than three optionally substituted methylene groups between the oxygen atoms of the carbonate group are incorporated into the polymer chain not at all or only to a small extent.

However, cyclic carbonates having fewer than three optionally substituted methylene groups between the oxygen atoms of the carbonate group may be used together with other suspension media. Preferred cyclic carbonates having fewer than three optionally substituted methylene groups between the oxygen atoms of the carbonate group are ethylene carbonate, propylene carbonate, 2,3-butanediol carbonate, 2,3-pentanediol carbonate, 2-methyl-1,2-propanediol carbonate and 2,3-dimethyl-2,3-butanediol carbonate.

Cyclic anhydrides are cyclic compounds containing an anhydride group in the ring. Preferred compounds are succinic anhydride, maleic anhydride, phthalic anhydride, 1,2-cyclohexanedicarboxylic anhydride, diphenic anhydride, tetrahydrophthalic anhydride, methyltetrahydrophthalic anhydride, norbornenedioic anhydride and the chlorination products thereof; succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl)dihydrofuran-2,5-dione, N-(2,5-dioxotetrahydrofuran-3-yl)formamide and 3[(2E)-but-2-en-1-yl]dihydrofuran-2,5-dione. Particular preference is given to succinic anhydride, maleic anhydride and phthalic anhydride.

Catalyst used for preparing the polyethercarbonate polyols of the invention may be, for example, a DMC catalyst (double metal cyanide catalyst). Additionally or alternatively it is also possible to use other catalysts for the copolymerization of alkylene oxides and $CO_2$ active catalysts, such as zinc carboxylates or cobalt-salen complexes, for example. Examples of suitable zinc carboxylates are zinc salts of carboxylic acids, especially dicarboxylic acids, such as adipic acid or glutaric acid. An overview of the known catalysts for the copolymerization of alkylene oxides and $CO_2$ is provided for example by Chemical Communications 47 (2011) 141-163.

It is preferred for the process of the invention to comprise the following step ($\beta$) between step ($\alpha$) and step ($\gamma$):

($\beta$) metering in of at least one epoxide.

It is preferred, furthermore, for the catalyst to be a DMC catalyst.

The double metal cyanide compounds present DMC catalysts which can be used with preference in the process of the invention are the reaction products of water-soluble metal salts and water-soluble metal cyanide salts.

The term "terpolymerization" in the sense of the invention comprehends the polymerization of at least one epoxide, at least two comonomers, and $CO_2$. Terpolymerization in the sense of the invention also includes, in particular, the copolymerization of a total of more than three monomers.

One preferred embodiment of the process of the invention for preparing polyethercarbonate polyols with unsaturated groups from at least two unsaturated compounds, one or more epoxides, and carbon dioxide, and also one or more H-functional starter compounds, in the presence of a DMC catalyst, is characterized in that ($\alpha$) [first activation stage] a suspension medium containing no H-functional groups, an H-functional starter compound, a mixture of a suspension medium containing no H-functional groups and an H-functional starter compound, or a mixture of at least two H-functional starter compounds is introduced initially, and optionally water and/or other volatile compounds are removed by increased temperature and/or reduced pressure, the DMC catalyst being added to the H-functional starter substance or to the mixture of at least two H-functional starter substances before, during or after the 1st activation stage, ($\beta$) [second activation stage] a portion (based on the total amount of the amount of epoxides used in steps ($\beta$) and ($\gamma$)) of one or more epoxides is added to the mixture resulting from step ($\alpha$), it being possible for the addition of a portion of epoxide to take place optionally in the presence of $CO_2$ and/or inert gas (such as nitrogen or argon, for example), and it also being possible for step ($\beta$) to take place multiply, ($\gamma$) [polymerization stage] one or more epoxides, at least two unsaturated compounds and carbon dioxide are metered continually into the mixture resulting from step ($\beta$), and the epoxides used for the terpolymerization may be the same as or different from the epoxides used in step ($\beta$).

Step ($\alpha$):

The addition of the individual components in step ($\alpha$) can be effected simultaneously or successively in any sequence; preferably, in step ($\alpha$), DMC catalyst is first initially charged and H-functional starter compound is added simultaneously or subsequently.

A preferred embodiment provides a process wherein, in step ($\alpha$), ($\alpha$1) a reactor is charged with the DMC catalyst and a suspension medium and/or one or more H-functional starter compounds, ($\alpha$2) an inert gas (for example nitrogen or a noble gas such as argon), an inert gas-carbon dioxide mixture or carbon dioxide is passed through the reactor at a temperature of 50 to 200° C., preferably of 80 to 160° C., more preferably of 125 to 135° C., and, at the same time, a reduced pressure (in absolute terms) of 10 mbar to 800 mbar, preferably of 40 mbar to 200 mbar, is established in the reactor by removing the inert gas or carbon dioxide (for example with a pump) [first activation stage].

A further preferred embodiment provides a process wherein, in step ($\alpha$), ($\alpha$1) a DMC catalyst and a suspension medium which contains no H-functional groups, an H-functional starter compound, a mixture of a suspension medium which contains no H-functional groups and an H-functional starter compound, or a mixture of at least two H-functional starter compounds is initially introduced, optionally under inert gas atmosphere, under an atmosphere of inert gas/carbon dioxide mixture, or under a pure carbon dioxide atmosphere, more preferably under inert gas atmosphere, and ($\alpha$2) an inert gas, an inert gas/carbon dioxide mixture or carbon dioxide, more preferably inert gas, is introduced into the resulting mixture of the DMC catalyst and the suspension medium which contains no H-functional groups, the H-functional starter compound, the mixture of a suspension medium which contains no H-functional groups and the H-functional starter compound, or the mixture of at least two H-functional starter compounds, at a temperature of 50 to 200° C., preferably of 80 to 160° C., more preferably of 125 to 135° C., and at the same time a reduced pressure (absolute) of 10 mbar to 800 mbar, preferably of 40 mbar to 200 mbar, is set in the reactor by removal of the inert gas or carbon dioxide (with a pump, for example) [first activation stage), where the double metal cyanide catalyst may be added to the H-functional starter substance or the mixture of at least two H-functional starter substances in step ($\alpha$1) or immediately thereafter in step ($\alpha$2).

The DMC catalyst may be added in solid form or in suspension in a suspension medium and/or in an H-functional starter compound. If the DMC catalyst is added as a suspension, it is added preferably in step ($\alpha$1) to the suspension medium or to the one or more H-functional starter compounds.

Step ($\beta$):

Step ($\beta$) of the second activation stage may take place in the presence of $CO_2$ and/or inert gas. Step ($\beta$) preferably takes place under an atmosphere composed of an inert gas/carbon dioxide mixture (nitrogen/carbon dioxide or argon/carbon dioxide, for example) or a carbon dioxide atmosphere, more preferably under a carbon dioxide atmosphere. There are in principle different ways in which an inert gas/carbon dioxide atmosphere or a carbon dioxide atmosphere can be set, and in which one or more oxides can be metered. The supply pressure is preferably established by introduction of carbon dioxide, where the pressure (in absolute terms) is 10 mbar to 100 bar, preferably 100 mbar to 50 bar and especially preferably 500 mbar to 50 bar. The start of epoxide metering may take place at any supply pressure chosen beforehand. The total pressure (in absolute terms) of the atmosphere is set in step (β) preferably in the range from 10 mbar to 100 bar, preferably 100 mbar to 50 bar, and more preferably 500 mbar to 50 bar. Optionally, during or after the metering of the epoxide, the pressure is reregulated by introduction of further carbon dioxide, with the pressure (in absolute terms) being 10 mbar to 100 bar, preferably 100 mbar to 50 bar, and more preferably 500 mbar to 50 bar.

In one preferred embodiment, the amount of one or more epoxides used in the activation of step (J) is 0.1 to 25.0 wt %, preferably 1.0 to 20.0 wt %, more preferably 2.0 to 16.0 wt %, based on the amount of suspension medium containing no H-functional groups used in step (α), or of H-functional starter compound, of mixture of suspension medium containing no H-functional groups and H-functional starter compound, or of the mixture of at least two H-functional starter compounds. The epoxide can be added in one step or stepwise in two or more portions.

In one particularly preferred embodiment of the invention, a portion (based on the total amount of the amount of epoxides used in steps (β) and (γ)) of one or more epoxides, in the case of the activation in step (β), is added to the mixture resulting from step (α), [second activation stage], it being possible for the addition of a portion of epoxide to take place optionally in the presence of $CO_2$ and/or inert gas. Step (β) may also take place multiply. The DMC catalyst is preferably used in an amount such that the amount of DMC catalyst in the resulting polyethercarbonate polyol with unsaturated groups is 10 to 10 000 ppm, more preferably 20 to 5000 ppm, and most preferably 50 to 500 ppm.

In the second activation step, the epoxide may be added, for example, in one portion or over the course of 1 to 15 minutes, preferably 5 to 10 minutes. The duration of the second activation step is preferably 15 to 240 minutes, more preferably 20 to 60 minutes.

Step (γ):

The metering of the epoxide or epoxides, of at least two unsaturated compounds, also referred to below as monomers, and of the carbon dioxide may take place simultaneously, alternately, or sequentially, and the overall amount of carbon dioxide may be added all at once or in a metered way over the reaction time. During the addition of the monomers it is possible for the $CO_2$ pressure, gradually or in steps, to be raised or lowered or left the same. Preferably, the total pressure is kept constant during the reaction by metered addition of further carbon dioxide. The metering of the monomers may take place simultaneously, alternatively, or sequentially to the metering of carbon dioxide. It is possible to meter the monomers at a constant metering rate or to raise or lower the metering rate continuously or in steps, or to add the monomers portionwise. The monomers are preferably added at constant metering rate to the reaction mixture. Where two or more epoxides are used for the synthesis of the polyethercarbonate polyols containing unsaturated groups, the epoxides may be metered individually or as a mixture. The metering of the epoxides may take place simultaneously, alternately, or sequentially via in each case separate feeds (additions), or via one or more feeds, in which case the epoxides may be metered individually or as a mixture. Via the nature and/or sequence of the metering of the monomers and/or of the carbon dioxide it is possible to synthesize random, alternating, blocklike or gradientlike polyethercarbonate polyols containing unsaturated groups.

Preference is given to using an excess of carbon dioxide, relative to the calculated amount of carbon dioxide required in the polyethercarbonate polyols containing unsaturated groups, since an excess of carbon dioxide is an advantage because of the reactive inertia of carbon dioxide. The amount of carbon dioxide can be specified by way of the total pressure. An advantageous total pressure (in absolute terms) for the copolymerization for preparation of the polyethercarbonate polyols containing unsaturated groups has been found to be the range from 0.01 to 120 bar, preferably 0.1 to 110 bar, more preferably from 1 to 100 bar. It is possible to supply the carbon dioxide to the reaction vessel continuously or discontinuously. This is dependent on the rate at which the monomers and the $CO_2$ are consumed and on whether the product is to include optionally $CO_2$-free polyether blocks or blocks with different $CO_2$ contents. The concentration of the carbon dioxide may also vary during the addition of the monomers. Depending on the reaction conditions selected, it is possible for the $CO_2$ to be introduced into the reactor in the gaseous, liquid or supercritical state. $CO_2$ can also be added to the reactor in solid form and then be converted under the selected reaction conditions to the gaseous, dissolved, liquid and/or supercritical state.

In step (γ), the carbon dioxide can be introduced into the mixture, for example, by
 (i) sparging the reaction mixture in the reactor from below,
 (ii) using a hollow-shaft stirrer,
 (iii) a combination of metering forms as per (i) and (ii), and/or
 (iv) sparging via the surface of the liquid, by using multilevel stirring elements.

Step (γ) is conducted, for example, at temperatures of 60 to 150° C., preferably from 80 to 120° C., most preferably from 90 to 110° C. If temperatures below 60° C. are set, the reaction ceases. At temperatures above 150° C., there is a sharp rise in the quantity of unwanted byproducts.

The sparging of the reaction mixture in the reactor as per (i) is preferably effected by means of a sparging ring, a sparging nozzle, or by means of a gas inlet tube. The sparging ring is preferably an annular arrangement or two or more annular arrangements of sparging nozzles, preferably arranged at the base of the reactor and/or on the side wall of the reactor.

The hollow-shaft stirrer as per (ii) is preferably a stirrer in which the gas is introduced into the reaction mixture via a hollow shaft in the stirrer. The rotation of the stirrer in the reaction mixture (i.e. in the course of mixing) gives rise to a reduced pressure at the end of the stirrer paddle connected to the hollow shaft, such that the gas phase (containing $CO_2$ and any unconsumed monomers) is sucked out of the gas space above the reaction mixture and is passed through the hollow shaft of the stirrer into the reaction mixture.

The sparging of the reaction mixture as per (i), (ii), (iii) or (iv) may take place with freshly metered carbon dioxide in each case and/or may be combined with suction of the gas from the gas space above the reaction mixture and subsequent recompression of the gas. For example, the gas sucked from the gas space above the reaction mixture and compressed, optionally mixed with fresh carbon dioxide and/or monomers, is introduced back into the reaction mixture as per (i), (ii), (iii) and/or (iv).

The pressure drop which comes about through incorporation of the carbon dioxide and the monomers into the reaction product in the terpolymerization is preferably balanced out by means of freshly metered carbon dioxide.

The monomers may be introduced separately or together with the $CO_2$, either via the liquid surface or directly into the liquid phase. The monomers are introduced preferably directly into the liquid phase, since this has the advantage of rapid mixing between the monomers introduced and the liquid phase, so preventing local concentration peaks of the monomers. The introduction into the liquid phase can be effected via one or more inlet tubes, one or more nozzles or one or more annular arrangements of multiple metering points, which are preferably arranged at the base of the reactor and/or at the side wall of the reactor.

The three steps ($\alpha$), ($\beta$) and ($\gamma$) can be performed in the same reactor, or each can be performed separately in different reactors. Particularly preferred reactor types are stirred tanks, tubular reactors and loop reactors. If the reaction steps ($\alpha$), ($\beta$) and ($\gamma$) are performed in different reactors, a different reactor type can be used for each step.

Polyethercarbonate polyols containing unsaturated groups can be prepared in a stirred tank, in which case the stirred tank, depending on design and mode of operation, is cooled via the reactor shell, internal cooling surfaces and/or cooling surfaces within a pumped circulation system. Both in semibatchwise application, in which the product is not removed until after the end of the reaction, and in continuous application, where the product is removed continuously, particular attention should be given to the metering rate of the monomers. It should be set so that, in spite of the inhibitory effect of the carbon dioxide, the monomers are depleted sufficiently rapidly by reaction. The concentration of free monomers in the reaction mixture during the second activation stage (step $\beta$) is preferably >0 to 100 wt %, more preferably >0 to 50 wt %, very preferably >0 to 20 wt % (based in each case on the weight of the reaction mixture). The concentration of free monomers in the reaction mixture during the reaction (step $\gamma$) is preferably >0 to 40 wt %, more preferably >0 to 25 wt %, very preferably >0 to 15 wt % (based in each case on the weight of the reaction mixture).

A further possible embodiment in a stirred tank for the copolymerization (step $\gamma$) is characterized in that one or more H-functional starter compounds are also metered continuously into the reactor during the reaction. In the case of performance of the process in semi-batchwise operation, the amount of the H-functional starter compounds which are metered continuously into the reactor during the reaction is preferably at least 20 mol % equivalents, more preferably 70 to 95 mol % equivalents (based in each case on the total amount of H-functional starter compounds). In the case of continuous performance of the process, the amount of the H-functional starter compounds which are metered continuously into the reactor during the reaction is preferably at least 80 mol % equivalents, more preferably 95 to 99.99 mol % equivalents (based in each case on the total amount of H-functional starter compounds).

In one preferred embodiment, the catalyst/starter mixture activated in steps ($\alpha$) and ($\beta$) is reacted further in the same reactor with the monomers and carbon dioxide. In another preferred embodiment, the catalyst/starter mixture activated in steps ($\alpha$) and ($\beta$) is reacted further in a different reaction vessel (for example, a stirred tank, tubular reactor or loop reactor) with the monomers and carbon dioxide. In a further preferred embodiment, the catalyst/starter mixture prepared in step ($\alpha$) is reacted in a different reaction vessel (for example, a stirred tank, tubular reactor or loop reactor) in steps ($\alpha$) and ($\gamma$) with the monomers and carbon dioxide.

In the case of reaction in a tubular reactor, the catalyst/starter mixture prepared in step ($\alpha$), or the catalyst/starter mixture activated in steps ($\alpha$) and ($\beta$), and optionally further starters, and also the monomers and carbon dioxide, are pumped continuously through a tube. When a catalyst/starter mixture prepared in step ($\alpha$) is used, the second activation stage in step ($\alpha$) takes place in the first part of the tubular reactor, and the terpolymerization in step ($\gamma$) takes place in the second part of the tubular reactor. The molar ratios of the co-reactants vary according to the desired polymer.

In one process variant, carbon dioxide is metered in its liquid or supercritical form, in order to permit optimum miscibility of the components. The carbon dioxide can be introduced at the inlet of the reactor and/or via metering points which are arranged along the reactor, in the reactor. A portion of the monomers may be introduced at the inlet of the reactor. The remaining amount of the monomers is introduced into the reactor preferably via two or more metering points arranged along the reactor. Mixing elements of the kind sold, for example, by Ehrfeld Mikrotechnik BTS GmbH are advantageously installed for more effective mixing of the co-reactants, or mixer-heat exchanger elements, which at the same time improve mixing and heat removal. Preferably, the mixing elements mix $CO_2$ which is being metered in and the monomers with the reaction mixture. In an alternative embodiment, different volume elements of the reaction mixture are mixed with one another.

Loop reactors can likewise be used to prepare polyethercarbonate polyols containing unsaturated groups. These generally include reactors having internal and/or external material recycling (optionally with heat exchange surfaces arranged in the circulation system), for example a jet loop reactor or Venturi loop reactor, which can also be operated continuously, or a tubular reactor designed in the form of a loop with suitable apparatuses for the circulation of the reaction mixture, or a loop of several series-connected tubular reactors or a plurality of series-connected stirred tanks.

In order to achieve full conversion, the reaction apparatus in which step ($\gamma$) is carried out may frequently be followed by a further tank or a tube ("delay tube") in which residual concentrations of free monomers present after the reaction are depleted by reaction. Preferably, the pressure in this downstream reactor is at the same pressure as in the reaction apparatus in which reaction step ($\gamma$) is performed. The pressure in the downstream reactor can, however, also be selected at a higher or lower level. In a further preferred embodiment, the carbon dioxide, after reaction step ($\gamma$), is fully or partly released and the downstream reactor is operated at standard pressure or a slightly elevated pressure. The temperature in the downstream reactor is preferably 10 to 150° C. and more preferably 20 to 100° C. At the end of the post-reaction time or at the outlet of the downstream reactor, the reaction mixture preferably contains less than 0.05 wt % of monomers. The post-reaction time or the residence time in the downstream reactor is preferably 10 min to 24 h, especially preferably 10 min to 3 h.

The polyethercarbonate polyols containing unsaturated groups that are obtainable in accordance with the invention preferably have an OH-functionality (i.e., average number of OH groups per molecule) of at least 0.8, preferably of 1 to 8, more preferably of 1 to 6, and very preferably of 2 to 4.

In an alternative embodiment, the OH groups are saturated with suitable reagents, prior to the crosslinking of the polyethercarbonate polyols, to give crosslinked polyether carbonates, and so the resulting saturated polyethercarbonate polyol has an OH-functionality of less than 0.8, preferably less than 0.5 and more preferably less than 0.1. In specific applications, this leads to a lower polarity of the crosslinked polyethercarbonates obtained after crosslinking, thereby lowering, for example, the water absorption of the materials. Suitable reagents for the saturation of the OH-functionalities are methylating agents, for example.

The molecular weight of the resulting polyethercarbonate polyols containing unsaturated groups is preferably at least 400 g/mol, more preferably 400 to 1 000 000 g/mol and most preferably 500 to 60 000 g/mol. In an alternative embodiment, the molecular weight of the polyethercarbonate polyol prior to crosslinking is increased by extension with suitable reagents. Thus, for example, it is possible to prepare a difunctional polyethercarbonate polyol having an average molecular weight of ≥1000 to ≤20 000 and subsequently to extend it to an average molecular weight of ≥10 000 to ≤5 000 000. Extended polyethercarbonate polyols preferably have a molecular weight of ≥100 000 to ≤50 000 000 and more preferably of ≥500 000 to ≤5 000 000. Suitable reagents for extending the polyethercarbonate polyols are, for example, diisocyanates such as hexamethylene diisocyanate (HDI), methylenediphenyl diisocyanate (MDI) or toluene diisocyanate (TDI).

As suitable H-functional starter compounds (starters) it is possible to use compounds having H atoms that are active in respect of the alkoxylation. Groups which have active H atoms and are active in respect of the alkoxylation are, for example, —OH, —NH$_2$ (primary amines), —NH— (secondary amines), —SH and —CO$_2$H, preferably —OH and —NH$_2$, especially preferably —OH. As H-functional starter substance it is possible for there to be, for example, one or more compounds selected from the group encompassing mono- or polyhydric alcohols, polyfunctional amines, polyfunctional thiols, amino alcohols, thio alcohols, hydroxy esters, polyether polyols, polyester polyols, polyesterether polyols, polyethercarbonate polyols, polycarbonate polyols, polycarbonates, polyethyleneimines, polyetheramines (e.g. so-called Jeffamine® products from Huntsman, such as D-230, D-400, D-2000, T-403, T-3000, T-5000 or corresponding products from BASF, such as Polyetheramine D230, D400, D200, T403, T5000), polytetrahydrofurans (e.g. PolyTHF® from BASF, such as PolyTHF® 250, 650S, 1000, 1000S, 1400, 1800, 2000), polytetrahydrofuranamines (BASF product Polytetrahydrofuranamine 1700), polyetherthiols, polyacrylate polyols, castor oil, the mono- or diglyceride of ricinoleic acid, monoglycerides of fatty acids, chemically modified mono-, di- and/or triglycerides of fatty acids, and C1-C24 alkyl fatty acid esters which contain on average at least 2 OH groups per molecule. The C1-C23 alkyl fatty acid esters which contain on average at least 2 OH groups per molecule are, for example, commercial products such as Lupranol Balance® (BASF AG), Merginolo products (Hobum Oleochemicals GmbH), Sovermol® products (Cognis Deutschland GmbH & Co. KG), and Soyol®™ products (USSC Co.).

The monofunctional starter compounds used may be alcohols, amines, thiols and carboxylic acids. The monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2 methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. The monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Examples of polyhydric alcohols suitable as H-functional starter substances are dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis(hydroxymethyl)cyclohexanes (such as, for example, 1,4-bis(hydroxymethyl) cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalized fats and oils, especially castor oil), and also all modification products of these aforementioned alcohols with different amounts of ε-caprolactone.

The H-functional starter substances may also be selected from the substance class of the polyether polyols, especially those having a molecular weight $M_n$ in the range from 100 to 4000 g/mol. Preference is given to polyether polyols formed from repeating ethylene oxide and propylene oxide units, preferably having a proportion of 35 to 100% propylene oxide units, more preferably having a proportion of 50 to 100% propylene oxide units. These may be random copolymers, gradient copolymers, alternating copolymers or block copolymers of ethylene oxide and propylene oxide. Suitable polyether polyols formed from repeating propylene oxide and/or ethylene oxide units are, for example, the Desmophena®, Acclaim®, Arcol®, Baycoll®, Bayfille®, Bayflex®, Baygal®, PET® and polyether polyols from Bayer MaterialScience AG (for example Desmophen® 3600Z, Desmophenn® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homopolyethylene oxides are, for example, the Pluriol® E products from BASF SE; suitable homo-polypropylene oxides are, for example, the Pluriol® P products from BASF SE; suitable mixed copolymers of ethylene oxide and propylene oxide are, for example, the Pluronic® PE or Pluriol® RPE products from BASF SE.

The H-functional starter substances may also be selected from the substance class of the polyester polyols, especially those having a molecular weight $M_n$ in the range from 200 to 4500 g/mol. Polyesters having a functionality of at least two can be used as polyester polyols. Preferably, polyester polyols consist of alternating acid and alcohol units. Examples of acid components which can be used include succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride, or mixtures of the stated acids and/or anhydrides. Examples of alcohol components used include ethanediol, 1,2-propanediol, 1,3-propanediol, 1,4-butanediol, 1,5-pentanediol, neopentyl glycol, 1,6-hexanediol, 1,4-bis(hydroxymethyl)cyclohexane, diethylene glycol, dipropylene glycol, trimethylolpropane, glycerol, pentaerythritol, or mixtures of the stated alcohols. If the alcohol components used are dihydric or polyhydric polyether polyols, the result is polyester ether polyols which can likewise serve as starter substances for preparation of the polyether carbonate polyols. Preference is given to using polyether polyols with $M_n$=150 to 2000 g/mol for preparation of the polyester ether polyols.

As H-functional starter substances it is additionally possible to use polycarbonate diols, especially those having a molecular weight $M_n$ in a range from 150 to 4500 g/mol, preferably 500 to 2500 g/mol, which are prepared, for example, by reaction of phosgene, dimethyl carbonate, diethyl carbonate or diphenyl carbonate and difunctional alcohols or polyester polyols or polyether polyols. Examples relating to polycarbonates are found for example in EP-A 1359177. As polycarbonate diols it is possible for example to use the Desmophen® C grades from Bayer Material-Science AG, such as Desmophen® C 1100 or Desmophena® C 2200, for example.

In a further embodiment of the invention, it is possible to use polyethercarbonate polyols and/or polyetherestercarbonate polyols as H-functional starter substances. In particular it is possible to use polyetherestercarbonate polyols. These polyetherestercarbonate polyols used as H-functional starter substances may for this purpose be prepared in a separate reaction step beforehand.

The H-functional starter substances generally have an OH-functionality (i.e. the number of H atoms active in respect of the polymerization per molecule) of 1 to 8, preferably of 2 to 6 and more preferably of 2 to 4. The H-functional starter substances are used either individually or as a mixture of at least two H-functional starter substances.

Preferred H-functional starter substances are alcohols with a composition according to the general formula (I),

HO—(CH$_2$)$_x$—OH (I)

where x is a number from 1 to 20, preferably an even number from 2 to 20. Examples of alcohols as per formula (I) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols of formula (I) with ε-caprolactone, e.g. reaction products of trimethylolpropane with ε-caprolactone, reaction products of glycerol with ε-caprolactone, and reaction products of pentaerythritol with ε-caprolactone. Preference is further given to using, as H-functional starter compounds, water, diethylene glycol, dipropylene glycol, castor oil, sorbitol and polyether polyols formed from repeating polyalkylene oxide units.

More preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, diethylene glycol, dipropylene glycol, glycerol, trimethylolpropane, di- and trifunctional polyether polyols, where the polyether polyol has been formed from a di- or tri-H-functional starter compound and propylene oxide or a di- or tri-H-functional starter compound, propylene oxide and ethylene oxide. The polyether polyols preferably have an OH-functionality of 2 to 4 and a molecular weight $M_n$ in the range from 62 to 4500 g/mol and more particularly a molecular weight $M_n$ in the range from 62 to 3000 g/mol.

Double metal cyanide (DMC) catalysts for use in the homopolymerization of epoxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts which are described in, for example, U.S. Pat. No. 5,470,813, EP-A 700 949, EP-A 743 093, EP-A 761 708, WO 97/40086, WO 98/16310 and WO 00/47649 possess a very high activity and permit the production of polyethercarbonates at very low catalyst concentrations. A typical example is that of the highly active DMC catalysts which are described in EP-A 700 949 and contain, as well as a double metal cyanide compound (e.g. zinc hexacyanocobaltate(III)) and an organic complex ligand (e.g. tert-butanol), also a polyether having a number-average molecular weight greater than 500 g/mol.

The DMC catalysts which can be used in accordance with the invention are preferably obtained by (1) in the first step, reacting an aqueous solution of a metal salt with the aqueous solution of a metal cyanide salt in the presence of one or more organic complex ligands, e.g. an ether or alcohol, (2) in the second step, using known techniques (such as centrifuging or filtering) to remove the solid from the suspension obtained from (α), (3) optionally, in a third step, washing the isolated solid with an aqueous solution of an organic complex ligand (e.g. by resuspending and subsequently again isolating by filtering or centrifuging), (4) and subsequently drying the resulting solid, optionally after pulverizing, at temperatures of in general 20-120° C. and at pressures of in general 0.1 mbar to atmospheric pressure (1013 mbar), and with addition, in the first step or immediately after the precipitation of the double metal cyanide compound (second step), of one or more organic complex ligands, preferably in excess (based on the double metal cyanide compound), and optionally of further complex-forming components.

The double metal cyanide compounds included in the DMC catalysts which can be used in accordance with the invention are the reaction products of water-soluble metal salts and water-soluble metal cyanide salts.

For example, an aqueous zinc chloride solution (preferably in excess relative to the metal cyanide salt) and potassium hexacyanocobaltate are mixed and then dimethoxyethane (glyme) or tert-butanol (preferably in excess, relative to zinc hexacyanocobaltate) is added to the resulting suspension.

Metal salts suitable for preparation of the double metal cyanide compounds preferably have a composition according to the general formula (II),

M(X)$_n$ (II), where
M is selected from the metal cations Zn$^{2+}$, Fe$^{2+}$, Ni$^{2+}$, Mn$^{2+}$, Co$^{2+}$, Sr$^{2+}$, Sn$^{2+}$, Pb$^{2+}$ and Cu$^{2+}$; M is preferably Zn$^{2+}$, Fe$^{2+}$, Co$^{2+}$ or Ni$^{2+}$,
X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 if X=sulfate, carbonate or oxalate and
n is 2 if X=halide, hydroxide, carboxylate, cyanate, thiocyanate, isocyanate, isothiocyanate or nitrate, or suitable metal salts preferably have a composition according to the general formula (III),

$$M_r(X)_3 \tag{III}$$

where
M is selected from the metal cations $Fe^{3+}$, $Al^{3+}$, $Co^{3+}$ and $Cr^{3+}$,
X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
r is 2 if X=sulfate, carbonate or oxalate and
r is 1 if X=halide, hydroxide, carboxylate, cyanate, thiocyanate, isocyanate, isothiocyanate or nitrate,
or suitable metal salts preferably have a composition according to the general formula (IV),

$$M(X)_s \tag{IV}$$

where
M is selected from the metal cations $Mo^{4+}$, $V^{4+}$ and $W^{4+}$,
X comprises one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 if X=sulfate, carbonate or oxalate and
s is 4 if X=halide, hydroxide, carboxylate, cyanate, thiocyanate, isocyanate, isothiocyanate or nitrate,
or suitable metal salts preferably have a composition according to the general formula (V),

$$M(X)_t \tag{V}$$

where
M is selected from the metal cations $Mo^{6+}$ and $W^{6+}$,
X comprises one or more (i.e. different) anions, preferably anions selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 if X=sulfate, carbonate or oxalate and
t is 6 if X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(II) chloride, cobalt(II) chloride, cobalt (II) thiocyanate, nickel(II) chloride and nickel(II) nitrate. It is also possible to use mixtures of different metal salts.

Metal cyanide salts suitable for preparing the double metal cyanide compounds preferably have a composition according to the general formula (VI)

$$(Y)_n M'(CN)_b(A)_c \tag{VI}$$

where
M' is selected from one or more metal cations from the group consisting of Fe(I), Fe(III), Co(II), Co(III), Cr(II), Cr(III), Mn(II), Mn(II), Ir(III), Ni(H), Rh(III), Ru(II), V(IV) and V(V); M' is preferably one or more metal cations from the group consisting of Co(II), Co(II), Fe(II), Fe(III), Cr(II), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and
a, b and c are integral numbers, the values for a, b and c being selected such as to ensure the electroneutrality of the metal cyanide salt; a is preferably 1, 2, 3 or 4; b is preferably 4, 5 or 6; c preferably possesses the value 0.

Examples of suitable metal cyanide salts are sodium hexacyanocobaltate(II), potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds included in the DMC catalysts which can be used in accordance with the invention are compounds having compositions according to the general formula (VII)

$$M_x[M'_{x'}(CN)_y]_z \tag{VII}$$

in which M is defined as in the formulae (II) to (V) and M' is as defined in formula (VI), and
x, x', y and z are integers and are chosen so as to give electron neutrality of the double metal cyanide compound.
Preferably,
x=3, x'=1, y=6 and z=2,
M=Zn(II), Fe(II), Co(II) or Ni(II) and
M'=Co(II), Fe(III), Cr(I) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). With particular preference it is possible to use zinc hexacyanocobaltate(III).

The organic complex ligands which can be added in the preparation of the DMC catalysts are disclosed in, for example, U.S. Pat. No. 5,158,922 (see, in particular, column 6, lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). For example, the organic complex ligands used are water-soluble, organic compounds having heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds which include both aliphatic or cycloaliphatic ether groups and aliphatic hydroxyl groups (such as ethylene glycol mono-tert-butyl ether, diethylene glycol mono-tert-butyl ether, tripropylene glycol monomethyl ether and 3-methyl-3-oxetanemethanol, for example). Extremely preferred organic complex ligands are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

In the preparation of the DMC catalysts that can be used in accordance with the invention, one or more complex-forming components are optionally used from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly (N-vinylpyrrolidone-co-acrylic acid), polyvinyl methyl ketone, poly(4-vinylphenol), poly(acrylic acid-co-styrene), oxazoline polymers, polyalkyleneimines, maleic acid copolymers and maleic anhydride copolymers, hydroxyethylcellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters, or ionic surface-active or interface-active compounds.

In the preparation of the DMC catalysts that can be used in accordance with the invention, preference is given to using the aqueous solutions of the metal salt (e.g. zinc chloride) in the first step in a stoichiometric excess (at least 50 mol %) relative to the metal cyanide salt. This corresponds at least to a molar ratio of metal salt to metal cyanide salt of 2.25:1.00. The metal cyanide salt (e.g. potassium hexacyanocobaltate) is reacted in the presence of the organic complex ligand (e.g. tert-butanol) to form a suspension which contains the double metal cyanide compound (e.g. zinc hexacyanocobaltate), water, excess metal salt, and the organic complex ligand.

This organic complex ligand may be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) is effected using a mixing nozzle, more preferably using a jet disperser, as described, for example, in WO-A 01/39883.

In the second step, the solid (i.e. the precursor of the catalyst) can be isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, for example, water-soluble byproducts, such as potassium chloride, can be removed from the catalyst that can be used in accordance with the invention. The amount of the organic complex ligand in the aqueous wash solution is preferably between 40 and 80 wt %, based on the overall solution.

Optionally in the third step the aqueous wash solution is admixed with a further complex-forming component, preferably in a range between 0.5 and 5 wt %, based on the overall solution.

Moreover, it is advantageous to wash the isolated solid more than once. In a first washing step (3-1), washing takes place preferably with an aqueous solution of the unsaturated alcohol (for example by resuspension and subsequent reisolation by filtration or centrifugation), in order thereby to remove, for example, water-soluble byproducts, such as potassium chloride, from the catalyst that can be used in accordance with the invention. The amount of the unsaturated alcohol in the aqueous wash solution is more preferably between 40 and 80 wt %, based on the overall solution of the first washing step. In the further washing steps (3-2), either the first washing step is repeated one or more times, preferably from one to three times, or, preferably, a non-aqueous solution, such as a mixture or solution of unsaturated alcohol and further complex-forming component (preferably in the range between 0.5 and 5 wt %, based on the total amount of the wash solution of step (3-2)), is employed as the wash solution, and the solid is washed with it one or more times, preferably one to three times.

The isolated and optionally washed solid can then be dried, optionally after pulverization, at temperatures of 20-100° C. and at pressures of 0.1 mbar to atmospheric pressure (1013 mbar).

One preferred method for isolating the DMC catalysts that can be used in accordance with the invention from the suspension by filtration, filtercake washing and drying is described in WO-A 01/80994.

The unsaturated comonomers may be distributed randomly or in blocks in the polyethercarbonate polyols. Gradient polymers can also be used.

Further embodiments and aspects of the invention are elucidated hereinafter. They can be combined with one another as desired, unless the opposite is clear from the context.

In a further refinement of the process, the unsaturated compound as per (γ2) is an unsaturated cyclic anhydride having a double bond adjacent to a carbonyl group. Unsaturated cyclic anhydrides having a double bond adjacent to a carbonyl group can be utilized extremely selectively and with high conversions, by the process of the invention, for the synthesis of polyethercarbonate polyols having unsaturated groups. Additionally, as a result of incorporation of cyclic anhydrides, the resulting polyethercarbonate polyol contains ester groups. The ease of incorporation of the unsaturated cyclic anhydrides into the resulting polyethercarbonate polyols is very likely due to effective interaction of these monomers with the DMC catalyst, leading to sufficient reactivity on the part of this class of substance. Furthermore, in particular, a carbonyl substitution adjacent to the double bond may lead to reduced electron density of specific double bonds within the polyethercarbonate polyols having unsaturated groups, which lend themselves well to conversion within further radical reactions.

In one additional aspect of the process, the unsaturated compound as per (γ2) conforms to one of the formulae (VIII), (IX) or (X),

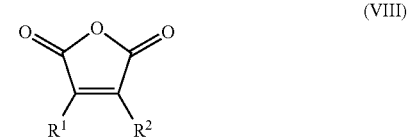

(VIII)

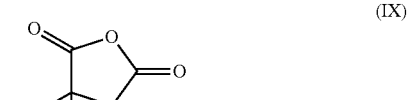

(IX)

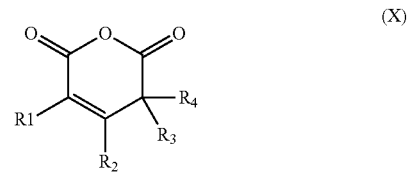

(X)

where $R_1$-$R_4$ independently of one another are H, halogen, substituted or unsubstituted C1-C22 alkyl or substituted or unsubstituted C6-C12 aryl. Cyclic anhydrides shown above, with the substitution pattern described, have proven particularly advantageous for the introduction of electron-poor double bond into the polyethercarbonate polyol having unsaturated groups. On the one hand, their conversion within the process of the invention is largely complete and proceeds at a high rate, and on the other hand it is possible for further radical conversions to be carried out, crosslinking reactions for example, without problems. Without being tied by the theory, this may be attributed very probably to the low-bulk substituents and hence to an unhindered access to the double bond.

Preferred compounds of the formulae (VIII), (IX) and (X) are maleic anhydride, itaconic anhydride, chloromaleic anhydride, and dichloromaleic anhydride. Particular preference is given to maleic anhydride.

Further unsaturated compounds as per (γ2) are mixed esters of fumaric or maleic acid, comprising a glycidyl ester and an ester of a C1 to C22 alkanol, a C5 to C15 cycloalkanol, or C7 to C14 aralkanol. Compounds of these groups are glycidyl methyl fumarate, glycidyl methyl maleinate, ethyl glycidyl fumarate, ethyl glycidyl maleinate, butyl glycidyl fumarate, butyl glycidyl maleinate, cyclohexyl glycidyl fumarate, cyclohexyl glycidyl maleinate, benzyl glycidyl fumarate, or benzyl glycidyl maleinate.

Compounds belonging both to group (γ2) and group (γ1) are likewise mixed esters of fumaric acid or maleic acid, comprising a glycidyl ester and an ester of a double bond-containing alcohol. Compounds of this group are allyl glycidyl fumarate, allyl glycidyl maleinate, and the esters of fumaric or maleic acid with glycidyl and trimethylolpropane diallyl ether.

In a further characteristic feature of the process, the unsaturated compound as per (γ2) is an unsaturated epoxide selected from the group of the glycidyl esters of α,β-unsaturated acids. The glycidyl esters of α,β-unsaturated acids also exhibit a selective and rapid reaction for the synthesis of the polyethercarbonate polyol having unsaturated groups. This is probably due to their particular steric construction, which facilitates effective interaction with the DMC catalyst. Furthermore, the unsaturated groups incorporated in this way into the polyethercarbonate polyol provide good steric and electronic conditions for rapid and high-yield conversions as part of further radically initiated reactions.

In a further refinement of the process, the unsaturated compound as per (γ2) conforms to the formula (XI):

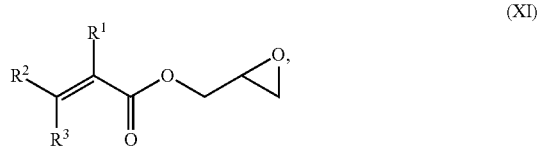

(XI)

where $R_1$-$R_3$ independently of one another are H, halogen, substituted or unsubstituted C1-C22 alkyl or substituted or unsubstituted C6-C12 aryl. As preferred representatives of the group of the glycidyl esters of α,β-unsaturated acids, the compounds of formula (XI) above display a substitution pattern which is particularly suitable for the synthesis of polyethercarbonate polyols having unsaturated groups. This class of compound can be reacted with high yields, by means of the DMC catalyst employable in accordance with the invention, to give polyethercarbonate polyols having unsaturated groups. Furthermore, as a result of the steric and electronic conditions in the region of the double bond, there may be good opportunities for further reaction to give higher-molecular-weight, crosslinked polyethercarbonates. Particularly preferred compounds are glycidyl acrylate or glycidyl methacrylate.

Other glycidyl esters of group (γ2) are glycidyl cinnamate or glycidyl sorbate.

Furthermore, within one preferred embodiment of the process, the temperature in step (γ) may be greater than or equal to 60° C. and less than or equal to 150° C. In a particularly preferred embodiment of the process, the temperature in step (γ) may be greater than or equal to 80° C. and less than or equal to 130° C., and very preferably greater than or equal to 90° C. and less than or equal to 120° C. This temperature range during the polymerization has proven particularly suitable for synthesis of the polyethercarbonate polyols containing unsaturated groups with a sufficient reaction rate and with a high selectivity. In the range of lower temperatures, the reaction rate which comes about may only be inadequate, and, at higher temperatures, the fraction of unwanted byproducts may increase too greatly. If temperatures are selected that are too high, there may, for example, be premature crosslinking of the unsaturated groups.

In a further embodiment of the process, the unsaturated compound as per (γ1) is selected from the group encompassing allyl glycidyl ether, vinyl cyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl ester of unsaturated fatty acids (such as oleic acid, linoleic acid, conjuene fatty acid or linoleic acid) and/or partly epoxidized fats and oils (such as partly epoxidized soybean oil, linseed oil, rapeseed oil, palm oil or sunflower oil).

The group of monomers listed above with electron-rich double bonding can be converted into polyethercarbonate polyols having unsaturated groups, with very high yields and sufficiently rapid reaction kinetics, very probably on account of their steric circumstances. The polyethercarbonate polyols obtained have unsaturated groups with an electron-rich double bond and can be converted very effectively to higher-molecular-weight polyethercarbonate as part of further reactions, as for example in radical crosslinking reactions.

In a further embodiment of the process, the unsaturated compound as per (γ1) is a cyclic anhydride which contains electron-rich double bonds. Examples of such cyclic anhydrides are 4-cyclohexene-1,2-doic anhydride, 4-methyl-4-cyclohexane-1,2-dioic anhydride, 5,6-norbornene-2,3-dioic anhydride, dodecenylsuccinic anhydride, tetradecenylsuccinic anhydride, hexadecenylsuccinic anhydride or octadecenylsuccinic anhydride, the double bond in the case of the alkenylsuccinic anhydrides not being an exo-double bond on the ring. Through incorporation of cyclic anhydrides of this kind, containing electron-rich double bonds, the resulting polyethercarbonate polyol additionally contains ester groups.

In one additional refinement of the process, the unsaturated compound with electron-poor double bonding may conform to one of the formulae (VIII), (IX), (X) or (XI), and the unsaturated compound with electron-rich double bond may be selected from the group encompassing allyl glycidyl ether, vinylcyclohexene oxide, cyclooctadiene monoepoxide, cyclododecatriene monoepoxides, butadiene monoepoxide, isoprene monoepoxide or limonene oxide.

Further in accordance with the invention is a polyethercarbonate polyol containing unsaturated groups, preparable by the process of the invention. The polyethercarbonate polyols having unsaturated groups of different electron density, obtainable by the process of the invention, may be distinguished by a very low residual fraction of unreacted monomers and by a low velocity. The polymer scaffold provides little steric shielding for the double bonds of the polymer chain, which, consequently, are readily accessible for further reactions. The mixture of double bonds which differ in their electron-rich status, in particular, may simplify the further radical conversion.

In a further embodiment, the molar ratio of the double bonds with substituents as per ($\gamma$1) to double bonds with substituents as per ($\gamma$2), including the structural units originally from cyclic anhydrides, in the polymer, is less than or equal to 3:1 and greater than or equal to 1:3, preferably less than or equal to 2:1 and greater than or equal to 1:2, very preferably less than or equal to 1.3:1 and greater than or equal to 1:1.3.

It has emerged, surprisingly, that polyethercarbonate polyols having unsaturated groups with a ratio of electron-poor to electron-rich double bonds within the range specified above may have particularly favorable properties in the context of further crosslinking reactions. Accordingly, in the case of polyethercarbonate polyols having unsaturated groups with larger or smaller ratios, there may be adverse effects on the reaction kinetics of crosslinking reactions. This may be such that it is necessary to accept possibly longer crosslinking times, or there may be only incomplete conversion.

In an additional refinement of the process, the ratio of carbonate ester groups to ether groups in the polyethercarbonate polyol may be less than or equal to 3:1 and greater than or equal to 1:3. This quantitative range for the incorporation of unsaturated monomers and of the $CO_2$ has proven to be particularly favorable for the polyethercarbonate polyols having unsaturated groups that are preparable by the process of the invention. This range may in particular be advantageous not only for the macroscopic properties of the polymer, such as the viscosity, for example, but also for the reactivity within further crosslinking reactions.

Within one preferred characteristic feature, the glass transition temperature of the polyethercarbonate polyol having unsaturated groups may be greater than or equal to −60° C. and less than or equal to 80° C. Furthermore, the glass transition temperature of the polyethercarbonate polyol having unsaturated groups may preferably be less than or equal to 50° C. and more preferably less than or equal to 30° C. The lower limit on the glass transition temperature may be preferably −40° C. and more preferably −20° C. This range of the glass transition temperatures is advantageous for ease of processing of the polymers. A reason for this is that the stated glass transition temperature range is linked with advantageous viscosity of the polymers. Higher glass transition temperatures, in contrast, are disadvantageous because the viscosity of the polyethercarbonate polyol having unsaturated groups is too high at the usual processing temperatures, this generally having the effect of incomplete conversion in further crosslinking reactions. Without being tied by the theory, the advantageous glass transition temperatures of the polyethercarbonate polyols of the invention having unsaturated groups come about through their polymer chain construction and the steric effects of the monomers used. The glass transition temperature can be measured using techniques known to the skilled person for determination, such as by DSC (Differential Scanning Calorimetry) or DMA (Dynamic Mechanical Analysis), for example. The glass transition temperature is determined preferably by DSC methods in accordance with ISO 6721-11 (Plastics—Determination of Dynamic-Mechanical Properties—Part 11: Glass Transition Temperature).

Further in accordance with the invention is a process for crosslinking polyethercarbonate polyols comprising unsaturated groups, the unsaturated groups comprising:

($\delta$1) double bonds comprising a substituent selected from the group of $-OX^1$, $-OCOX^1$, $-X^1$, $-CH_2OX^1$ and/or $-CH=CHX^1$ where $X^1$ in each case is substituted or unsubstituted alkyl, substituted or unsubstituted cycloalkyl, substituted or unsubstituted aryl or a substituted or unsubstituted methylene chain;

and ($\delta$2) double bonds comprising a substituent selected from the group of $-F$, $-Cl$, $-Br$, $-I$, $-COH$, $-COX^2$, $-COOX^2$, $-C\equiv N$ and/or $-NO_2$, where $X^2$ in each case is substituted or unsubstituted alkyl, substituted or unsubstituted cycloalkyl, substituted or unsubstituted aryl or a substituted or unsubstituted methylene chain;

the polyethercarbonate polyols being reacted with one another with addition of an initiator selected from the group of the photoinitiators, metal-activated peroxides and/or redox initiators.

Within this further process step, not only mixtures of polyethercarbonate polyols containing electron-rich double bonds with polyethercarbonate polyols containing electron-poor double bonds but also polyethercarbonate polyols containing electron-rich and electron-poor double bonds within the same molecule can be reacted with one another. The radical polymerization can be initiated using initiators which are described in Myers, Terry N. Kirk-Othmer, Encyclopedia of Chemical Technology (5th edition) (2005), 14 274-311 or in Bevington, John C. Makromolekulare Chemie, Macromolecular Symposia (1987), 10(1), 89;

photoinitiators which are described in Fouassier, Jean Pierre; Allonas, Xavier; Lalevee, Jacques; Dietlin, Celine. Photochemistry and Photophysics of Polymer Materials (2010), 351-419;

metal-activated peroxides which are described in Sma, Christian, Angewandte Makromolekulare Chemie (1969), 9 165-181, or redox initiators which are described in Misra, G. S.; Bajpai U. D. N. Progress in Polymer Science (1982) 8 (1-2), 61-131.

The radical initiators can be used in amounts of 0.01-2 wt %, based on the polyethercarbonate polyol; redox initiators are a mixture of an oxidizing substance and a reducing substance, and photoinitiators of type II require the addition of a hydrogen donor, such as an amine or a mercapto compound.

In a further refinement of the process, a mixture of polyethercarbonate polyols having unsaturated groups comprising double bonds as per ($\delta$1) and of polyethercarbonate polyols having unsaturated groups comprising double bonds as per ($\delta$2) can be crosslinked. The process of the invention therefore includes not only the reaction of polyethercarbonate polyols having unsaturated groups which feature electron-rich and electron-poor groups within the same polymer, but also the reaction of two different polymer species with unsaturated groups one of which has only electron-rich double bonds and the other of which has only electron-poor double bonds. In particular, a crosslinking reaction between these two different polymer species may contribute to a process regime with similar advantage to the use of only one polymer species having two types of double bond.

Within one preferred embodiment of the process, the initiator can be added in an amount of greater than or equal to 0.01 wt % and less than or equal to 2 wt %/o, based on the polyethercarbonate polyol. Advantageously it is possible to use the quantity of initiators stated above in order to crosslink the polyethercarbonate polyols having unsaturated groups. Lower concentrations of initiator may result in uneven and excessively slow reaction of the unsaturated groups in the individual polyethercarbonate polyol molecules, while larger concentrations of initiator may lead to a reaction which is difficult to control, with product properties that are poorly reproducible.

Further in accordance with the invention is a crosslinked polyethercarbonate obtainable by the crosslinking process of the invention. The crosslinked polyethercarbonates obtainable by the process of the invention exhibit reproducible mechanical properties. This is probably because of an advantageous viscosity of the reactants used and an advantageous crosslinking reaction through use of electron-rich and electron-poor double bonds. This may be significantly more advantageous by comparison with the use of only one kind of double bond.

The crosslinked polyethercarbonates obtainable accordingly may find use as rubbers, sealants, adhesives, coating materials, or thermoset moldings. They are obtainable from liquid starting products which are easy to process, and, in contrast to unsaturated polyesters, they contain no low molecular mass monomers, such as styrene, vinyl ethers or vinyl esters. Furthermore, the mixtures to be cured may be solvent-free. The crosslinked polyethercarbonates may also be suitable for use for printing inks, lithography or stereolithography (rapid prototyping).

A further subject of the present invention is a composition comprising:
  a first polyethercarbonate polyol containing double bonds, the double bonds comprising a substituent which is selected from the group of $-OX^1$, $-OCOX^1$, $-X^1$, $CH_2OX^1$ and/or $-CH=CHX^1$, where $X^1$ in each case is substituted or unsubstituted alkyl, substituted or unsubstituted cycloalkyl, substituted, substituted or unsubstituted aryl or a substituted or unsubstituted methylene chain; and
  a second polyethercarbonate polyol containing double bonds, the double bonds comprising a substituent which is selected from the group of $-F$, $-Cl$, $-Br$, $-I$, $-COH$, $-COX^2$, $-COOX^2$, $-C\equiv N$ and/or $-NO_2$, where $X^2$ in each case is substituted or unsubstituted alkyl, substituted or unsubstituted cycloalkyl, substituted or unsubstituted aryl or a substituted or unsubstituted methylene chain.

This composition can be crosslinked in accordance with the process described above. Accordingly it can be described as a mixture comprising polyethercarbonate polyols having unsaturated groups as per (δ1) and of polyethercarbonate polyols having unsaturated groups comprising double bonds as per (δ2).

The first and second polyethercarbonate polyols may be prepared in analogy to the process of the invention for preparing polyethercarbonate polyols having unsaturated groups, with only one of the groups of compounds, (γ1) or (γ2) being used in each case in step (γ), Further in accordance with the invention is a molding having a layer comprising a crosslinked polyethercarbonate of the invention. The crosslinked polyethercarbonates producible in accordance with the invention may be particularly suitable for construction of mechanically stable layers on moldings, since the polyethercarbonate polyols of the invention can be placed simply and reproducible on moldings, and since a further crosslinking reaction, with radical initiators, for example, can be carried easily and reproducibly.

For further advantages and features of the above-described molding, reference is hereby made explicitly to the elucidations in connection with the polyethercarbonate polyols of the invention and with the process of the invention. Inventive features and advantages of the polyethercarbonate polyols are also intended to be applicable for the process of the invention and for the moldings of the invention, and are considered to be disclosed as such, and vice versa. The invention also encompasses all combinations of at least two features disclosed in the description and/or in the claims.

In a first embodiment, therefore, the invention relates to a process for preparing polyethercarbonate polyols, the polyethercarbonate polyols comprising double bonds, the process comprising the steps of:
  (α) initially introducing a catalyst and
    (αα) a suspension medium which contains no H-functional groups and/or
    (αβ) an H-functional starter compound
  (γ) metering in carbon dioxide, an epoxide which contains no unsaturated group, and at least two unsaturated compounds,
characterized in that the unsaturated compounds metered in step (γ) are selected from the group of the unsaturated epoxides and/or unsaturated cyclic anhydrides, and
  (γ1) one of the unsaturated compounds comprises a double bond comprising at least one substituent selected from the group of $-OX^1$, $-OCOX^1$, $-X^1$, $-CH_2OX^1$ and/or $-CH=CHX^1$, where $X^1$ in each case is substituted or unsubstituted alkyl, substituted or unsubstituted cycloalkyl, substituted or unsubstituted aryl or a substituted or unsubstituted methylene chain;
  (γ2) and another of the unsaturated compounds comprises a double bond comprising at least one substituent selected from the group of $-F$, $-Cl$, $-Br$, $-I$, $-COH$, $-COX^2$, $-COOX^2$, $-C\equiv N$ and/or $-NO_2$ or is an unsaturated, substituted or unsubstituted cyclic, where $X^2$ in each case is substituted or unsubstituted alkyl, substituted or unsubstituted cycloalkyl, substituted or unsubstituted aryl or a substituted or unsubstituted methylene chain;
and where additionally, if no H-functional starter compound is introduced in step (α), step (γ) comprises the metering in of an H-functional starter compound.

In a second embodiment, the invention relates to a process according to the first embodiment, further comprising the step (β) between step (α) and step (γ):
  (β) metering in of at least one epoxide.

In a third embodiment, the invention relates to a process according to the first or second embodiment, the catalyst being a DMC catalyst.

In a fourth embodiment, the invention relates to a process according to one of embodiments 1 to 3, the unsaturated compound as per (γ2) being an unsaturated cyclic anhydride having a double bond adjacent to a carbonyl group.

In a fifth embodiment, the invention relates to a process according to any of embodiments 1 to 4, the unsaturated compound as per (γ2) being an unsaturated epoxide selected from the group of glycidyl esters of α,β-unsaturated acids.

In a sixth embodiment, the invention relates to a process according to any of embodiments 1 to 5, the temperature in step (γ) being greater than or equal to 60° C. and less than or equal to 150° C.

In a seventh embodiment, the invention relates to a process according to any of embodiments 1 to 6, the unsaturated compound as per (γ1) being selected from the group encompassing allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids and/or partially epoxidized fats and oils.

In an eighth embodiment, the invention relates to a polyethercarbonate polyol containing unsaturated groups, preparable by a process according to any of the aforementioned embodiments.

In a ninth embodiment, the invention relates to a polyethercarbonate polyol according to the eighth embodiment, the molar ratio of the double bonds having substituents as per (γ1) to double bonds with substituents as per (γ2), including the structural units originating from cyclic anhydrides, in the polymer being less than or equal to 3:1 and greater than or equal to 1:3.

In a tenth embodiment, the invention relates to a polyethercarbonate polyol according to the eighth or ninth embodiment, the glass transition temperature of the polyethercarbonate polyol having unsaturated groups being greater than or equal to −60° C. and less than or equal to 80° C.

In an eleventh embodiment, the invention relates to a process for crosslinking polyethercarbonate polyols containing unsaturated groups comprising:

(Δ1) double bonds comprising at least one substituent selected from the group of —$OX^1$, —$OCOX^1$, —$X^1$, —$CH_2OX^1$ and/or —CH=$CHX^1$, where $X^1$ in each case is substituted or unsubstituted alkyl, substituted or unsubstituted cycloalkyl, substituted or unsubstituted aryl or a substituted or unsubstituted methylene chain; </535 and (δ2) double bonds comprising at least one substituent selected from the group of —F, —Cl, —Br, —I, —COH, —$COX^2$, —$COOX^2$, —C≡N and/or —$NO_2$, where $X^2$ in each case is substituted or unsubstituted alkyl, substituted or unsubstituted cycloalkyl, substituted or unsubstituted aryl or a substituted or unsubstituted methylene chain;
the polyethercarbonate polyols being reacted with one another with addition of an initiator selected from the group of the photoinitiators, metal-activated peroxides and/or redox initiators.

In a twelfth embodiment, the invention relates to a process according to the eleventh embodiment, a mixture of polyethercarbonate polyols comprising double bonds as per (δ1) and of polyethercarbonate polyols comprising double bonds as per (δ2) being crosslinked.

In a thirteenth embodiment, the invention relates to a crosslinked polyethercarbonate producible by a process according to the eleventh or twelfth embodiment.

In a fourteenth embodiment, the invention relates to the use of crosslinked polyethercarbonates according to the thirteenth embodiment as rubbers, sealants, adhesives, coated materials, or thermoset moldings.

In a fifteenth embodiment, the invention relates to a composition comprising:

a first polyethercarbonate polyol containing double bonds, the double bonds comprising a substituent which is selected from the group of —$OX^1$, —$OCOX^1$, —$X^1$, —$CH_2OX^1$ and/or —CH=$CHX^1$, where $X^1$ in each case is substituted or unsubstituted alkyl, substituted or unsubstituted cycloalkyl, substituted or unsubstituted aryl or a substituted or unsubstituted methylene chain; and a second polyethercarbonate polyol containing double bonds, the double bonds comprising a substituent which is selected from the group of —F, —Cl, —Br, —I, —COH, —$COX^2$, —$COOX^2$, —C≡N and/or —$NO_2$, where $X^2$ in each case is substituted or unsubstituted alkyl, substituted or unsubstituted cycloalkyl, substituted or unsubstituted aryl or a substituted or unsubstituted methylene chain.

EXAMPLES

Substances:
H-functional starter substance (starter) used:
PET-1 difunctional poly(oxypropylene)polyol having an OH number of 112 $mg_{KOH}$/g
Epoxide without double bonds used:
PO propylene oxide
Compound used containing electron-poor double bonds:
MA maleic anhydride
Compound used containing electron-rich double bonds:
AGE allyl glycidyl ether
The DMC catalyst was prepared according to example 6 of WO-A 01/80994.
Methods:
OH number (hydroxyl number)
The OH number (hydroxyl number) was determined in a method based on DIN 53240-2, but using N-methylpyrrolidone instead of THF/dichloromethane as solvent. Titration took place with 0.5 molar ethanolic KOH solution, with endpoint recognition by means of potentiometry. The test substance used was certified castor oil. The reporting of the unit in "mg KOH/g" refers to mg[KOH]/g[polyethercarbonate polyol].

Gel Permeation Chromatography
The number-average $M_n$ and the weight-average $M_w$ molecular weights of the resultant polyethercarbonate polyols were determined by means of gel permeation chromatography (GPC). The procedure was that of DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.

Rheology
The viscosity of the product mixture was determined using a Physica MCR 501 rheometer from Anton Paar at 25° C., using a sphere/plate configuration with a sphere diameter of 25 mm and with a distance of 0.05 mm between sphere and plate. The shear rate was increased over 10 minutes from 0.01 to 1000 l/s. A value was taken every 10 seconds. The result reported is the viscosity as the average of the total of 60 measurement values.

Thermal Analysis
The glass transition temperature was measured using a Mettler Toledo DSC 1. Between 4 and 10 mg of the sample to be measured were heated from −80° C. to 40° C. at a heating rate of 10 K/min. The evaluation software used was STAR$^e$ 25 SW 11.00. For the determination of the glass transition temperature, a tangential evaluation method was applied unless otherwise stated. The glass transition temperature reported is the mid-point between the point of intersection of the middle tangent with the low-temperature tangent and the point of intersection of the middle tangent with the high-temperature tangent.

¹H-NMR Spectroscopy

The sample was dissolved in deuterated chloroform and measured on a Bruker spectrometer (AV400, 400 MHz).

Preparation of the Polyethercarbonate Polyols Having Unsaturated Groups:

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (maximum heating power 510 watts). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The heating power of the electrical heating jacket during the activation [first activation stage] averaged about 20% of the maximum heating power. As a result of the regulation, the heating power varied by ±5% of the maximum heating power. The incidence of an elevated evolution of heat in the reactor, brought about by the rapid reaction of propylene oxide during the activation of the catalyst [second activation stage], was observed via reduced heating power of the heating jacket, engagement of the counter-cooling, and, optionally, a temperature increase in the reactor. The incidence of evolution of heat in the reactor, brought about by the continuous reaction of propylene oxide and of the compounds containing double bonds during the reaction [polymerization stage], led to a fall in the power of the heating jacket to about 8% of the maximum heating power. As a result of the regulation, the heating power varied by ±5% of the maximum heating power.

The stirrer used in the examples was a hollow-shaft stirrer in which the gas was introduced into the reaction mixture via a hollow stirrer shaft. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture.

a) The terpolymerization of propylene oxide, at least two unsaturated compounds and $CO_2$ results not only in the cyclic propylene carbonate but also in the polyether carbonate polyol having unsaturated groups, comprising firstly polycarbonate units shown in formula (XIIa)

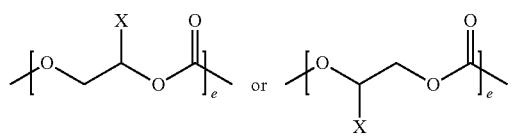

(XIIa)

and secondly polyether units shown in formula (XIIb):

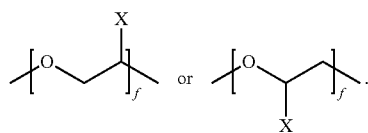

(XIIb)

The reaction mixture was characterized by ¹H-NMR spectroscopy and gel permeation chromatography.

The ratio of the amount of cyclic propylene carbonate to polyethercarbonate polyol (selectivity; ratio g/e) and also the fraction of unreacted monomers (propylene oxide $R_{PO}$, allyl glycidyl ether $A_{double\ bond}$ in mol %, maleic anhydride $B_{double\ bond}$ in mol %) were determined by means of ¹H-NMR spectroscopy.

Subsequently, the reaction mixture was diluted with dichloromethane (20 ml) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyethercarbonate polyol (ratio e/f) and also the molar fraction of allyl glycidyl ether and maleic anhydride incorporated into the polymer were determined by means of ¹H-NMR spectroscopy.

The relevant resonances in the ¹H-NMR spectrum (based on TMS=0 ppm) which were used for integration are as follows:

| Signal | Shift in ppm | Designation | Area corresponds to number of H atoms |
|---|---|---|---|
| I1 | 1.10-1.17 | $CH_3$ group of the polyether units | 3 |
| I2 | 1.25-1.34 | $CH_3$ group of the polycarbonate units | 3 |
| I3 | 1.45-1.48 | $CH_3$ group of the cyclic carbonate | 3 |
| I4 | 2.95-3.00 | CH groups of the free propylene oxide not consumed by reaction | 1 |
| I5 | 5.83-5.94 | CH group of the double bond obtained in the polymer via the incorporation of allyl glycidyl ether | 1 |
| I6 | 6.22-6.29 | CH group of the double bond obtained in the polymer via the incorporation of maleic anhydride | 2 |
| I7 | 7.03-7.04 | CH group for free maleic anhydride not consumed by reaction | 2 |
| I8 | 2.85-2.90 | CH groups of the free allyl glycidyl ether not consumed by reaction | 1 |

The figure reported is the molar ratio of the amount of cyclic propylene carbonate to carbonate units in the polyether carbonate polyol (selectivity g/e) and the molar ratio of carbonate groups to ether groups in the polyether carbonate polyol (e/f), and also the fractions of the unreacted propylene oxide (in mol %) and maleic anhydride (in mol %).

Taking account of the relative intensities, the values were calculated as follows:

Molar ratio of the amount of cyclic propylene carbonate to carbonate units in the polyether carbonate polyol (selectivity g/e):

$$g/e = I3/I2$$

Molar ratio of carbonate groups to ether groups in the polyethercarbonate polyol (e/f):

$$e/f = I2/I1$$

The fraction of carbonate units in the repeating units of the polyethercarbonate polyol obtained from the copolymerization of propylene oxide and $CO_2$:

$$C_{carbonate}=[(I2/3)/((I1/3)+(I2/3))]\times 100\%$$

The molar proportion of the unconverted propylene oxide ($R_{PO}$ in mol %) based on the sum total of the amount of propylene oxide used in the activation and the copolymerization is calculated by the formula:

$$R_{PO}=[(I4)/((I1/3)+(I2/3)+(I3/3)+(I4))]\times 100\%$$

The fraction of carbonate units in the repeating units of the polyethercarbonate polyol obtained from the terpolymerization of propylene oxide, allyl glycidyl ether and $CO_2$:

$$C'_{carbonate}=[(I2/3)/((I1/3)+(I2/3)+(I5))]\times 100\%$$

The fraction of double bonds resulting from the incorporation of allyl glycidyl ether in the repeating units of the polyethercarbonate polyol:

$$A_{double\ bond}=[(I5)/((I1/3)+(I2/3)+(I5))]\times 100\%$$

The molar proportion of the unconverted propylene oxide ($R_{PO}$ in mol %) based on the sum total of the amount of propylene oxide used in the activation and the copolymerization, calculated by the formula:

$$R'_{PO}=[(I4)/((I1/3)+(I2/3)+(I3/3)+(I4)+(I5)+(I8))]\times 100\%$$

The molar proportion of the unconverted allyl glycidyl ether ($R_{AGE}$ in mol %) based on the sum total of the amount of maleic anhydride used in the activation and the copolymerization is calculated by the formula:

$$R_{AGE}=[(I8)/((I1/3)+(I2/3)+(I3/3)+(I4)+(I5)+(I8))]\times 100\%$$

The fraction of carbonate units in the repeating units of the polyetherestercarbonate polyol obtained from the terpolymerization of propylene oxide, maleic anhydride, and $CO_2$:

$$c''_{carbonate}=[(I2/3)/((I1/3)+(I2/3)+(I6/2))]\times 100\%$$

The proportion of the double bonds which result via the incorporation of the maleic anhydride in the repeat units of the polyether ester carbonate polyol:

$$B_{double\ bond}=[(I6/2)/((I1/3)+(I2/3)+(I6/2))]\times 100\%$$

The molar proportion of the unconverted propylene oxide ($R_{PO}$ in mol %) based on the sum total of the amount of propylene oxide used in the activation and the copolymerization is calculated by the formula:

$$R''_{PO}=[(I4)/((I1/3)+(I2/3)+(I3/3)+(I4)+(I6/2)+(I7/2))]\times 100\%$$

The molar proportion of the unconverted maleic anhydride ($R_{MA}$ in mol %) based on the sum total of the amount of maleic anhydride used in the activation and the copolymerization is calculated by the formula:

$$R_{MA}=[(I7/2)/((I1/3)+(I2/3)+(I3/3)+(I4)+(I6/2)+(I7/2))]\times 100\%$$

The fraction of carbonate units in the repeating units of the polyetherestercarbonate polyol obtained from the terpolymerization of propylene oxide, allyl glycidyl ether, maleic anhydride and $CO_2$:

$$C'''_{carbonate}=[(I2/3)/((I1/3)+(I2/3)+(I5)+(I6/2))]\times 100\%$$

The fraction of double bonds resulting from the incorporation of allyl glycidyl ether in the repeating units of the polyetherestercarbonate polyol:

$$A'_{double\ bond}=[(I5)/((I1/3)+(I2/3)+(I5)+(I6/2))]\times 100\%$$

The proportion of the double bonds which result via the incorporation of the maleic anhydride in the repeat units of the polyether ester carbonate polyol:

$$B'_{double\ bond}=[(I6/2)/((I1/3)+(I2/3)+(I5)+(I6/2))]\times 100\%$$

The molar proportion of the unconverted propylene oxide ($R''_{PO}$ in mol %) based on the sum total of the amount of propylene oxide used in the activation and the copolymerization is calculated by the formula:

$$R''_{PO}=[(I4)/((I1/3)+(I2/3)+(I3/3)+(I4)+(I5)+(I6/2)+(I7/2)+(I8))]\times 100\%$$

The molar proportion of the unconverted allyl glycidyl ether ($R'_{AGE}$ in mol %) based on the sum total of the amount of maleic anhydride used in the activation and the copolymerization is calculated by the formula:

$$R'_{AGE}=[(I8)/((I1/3)+(I2/3)+(I3/3)+(I4)+(I5)+(I6/2)+(I7/2)+(18))]\times 100\%$$

The molar proportion of the unconverted maleic anhydride ($R'_{MA}$ in mol %) based on the sum total of the amount of maleic anhydride used in the activation and the copolymerization is calculated by the formula:

$$R'_{MA}=[(I7/2)/((I1/3)+(I2/3)+(I3/3)+(I4)+(I5)+(I6/2)+(I7/2)+(I8))]\times 100\%$$

The number-average $M_n$ and the weight-average $M_w$ molecular weights of the resultant polyethercarbonate polyols were determined by means of gel permeation chromatography (GPC).

Terpolymer 1-1: Terpolymerization of a Mixture of Propylene Oxide, 4.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (8.2 wt % of allyl glycidyl ether, corresponding to 4.3 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 53.9 g of the monomer mixture (8.2 wt % of allyl glycidyl ether) were metered in via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide ($R'_{PO}=0\%$) and allyl glycidyl ether ($R_{AGE}=0\%$) monomers used.

| Selectivity | g/e | 0.05 |
|---|---|---|
|  | e/f | 0.23 |
| $C'_{carbonate}$ in % | | 19.3 |
| $A_{double\ bond}$ in % | | 2.6 |
| Molecular weight in g/mol | $M_n$ | 5428 |
| Polydispersity | | 1.2 |
| OH number in $mg_{KOH}/g$ | | 26.0 |

-continued

| | | |
|---|---|---|
| Viscosity in mPa · s | | 4600 |
| Glass transition temperature in °C. | | 53.8 |

Terpolymer 1-2: Terpolymerization of a Mixture of Propylene Oxide, 8.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (15.2 wt % of allyl glycidyl ether, corresponding to 8.3 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (15.2 wt % of allyl glycidyl ether) were metered in via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide ($R'_{PO}$=0%) and allyl glycidyl ether ($R_{AGE}$=0%) monomers used.

| | | |
|---|---|---|
| Selectivity | g/e | 0.06 |
| | e/f | 0.25 |
| $C'_{carbonate}$ in % | | 20.3 |
| $A_{double\ bond}$ in % | | 6.4 |
| Molecular weight $M_n$ in g/mol | | 5446 |
| Polydispersity | | 2.0 |
| OH number in $mg_{KOH}/g$ | | 26.9 |
| Viscosity in mPa · s | | 4000 |
| Glass transition temperature in °C. | | 56.7 |

Terpolymer 1-3: Terpolymerization of a Mixture of Propylene Oxide, 16.4 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, during which a slight drop in temperature was observed, and re-establishment of a temperature of 130° C., 2.0 g of a monomer mixture (30.4 wt % of allyl glycidyl ether [corresponding to 16.4 mol %] in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (30.4 wt % of allyl glycidyl ether) were metered in via an HPLC pump (1 ml/min), with the $CO_2$ pressure being kept constant at 15 bar. The reaction mixture was subsequently stirred at 100° C. for 2 hours more. The reaction was halted by cooling of the reactor with ice-water.

The resulting mixture was free from the propylene oxide ($R'_{PO}$=0%) and allyl glycidyl ether ($R_{AGE}$=0%) monomers used.

| | | |
|---|---|---|
| Selectivity | g/e | 0.09 |
| | e/f | 0.28 |
| $C'_{carbonate}$ in % | | 22.2 |
| $A_{double\ bond}$ in % | | 13.6 |
| Molecular weight $M_n$ in g/mol | | 5432 |
| Polydispersity | | 1.8 |
| OH number in $mg_{KOH}/g$ | | 28.6 |
| Viscosity in mPa · s | | 4800 |
| Glass transition temperature in °C. | | 57.2 |

Terpolymer 2-1: Terpolymerization of a Mixture of Propylene Oxide, 4.1 Mol % Maleic Anhydride and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (6.5 wt % of maleic anhydride, corresponding to 4.1 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (6.5 wt % of maleic anhydride in solution in propylene oxide) were metered in via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide ($R''_{PO}$=0%) and maleic anhydride ($R_{MA}$=0%) monomers used.

| | | |
|---|---|---|
| Selectivity | g/e | 0.05 |
| | e/f | 0.32 |
| $C''_{carbonate}$ in % | | 23.5 |
| $B_{double\ bond}$ in % | | 2.7 |
| Molecular weight $M_n$ in g/mol | | 5293 |
| Polydispersity | | 1.7 |
| OH number in $mg_{KOH}/g$ | | 24.9 |
| Viscosity in mPa · s | | 13 300 |
| Glass transition temperature in °C. | | 48.7 |

Terpolymer 2-2: Terpolymerization of a Mixture of Propylene Oxide, 8.4 Mol % Maleic Anhydride and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (13.3 wt % of maleic anhydride, corresponding to 8.4 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (13.3 wt % of maleic anhydride in solution in propylene oxide) were metered in via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide ($R''_{PO}=0\%$) and maleic anhydride ($R_{MA}=0\%$) monomers used.

| Selectivity | g/e | 0.02 |
|---|---|---|
|  | e/f | 0.36 |
| $C''_{carbonate}$ in % |  | 24.9 |
| $B_{double\ bond}$ in % |  | 6.1 |
| Molecular weight $M_n$ in g/mol |  | 5657 |
| Polydispersity |  | 2.2 |
| OH number in $mg_{KOH}/g$ |  | 27.1 |
| Viscosity in mPa · s |  | 14 200 |
| Glass transition temperature in ° C. |  | 41.9 |

Terpolymer 2-3; Terpolymerization of Propylene Oxide, 16.6 Mol % Maleic Anhydride and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (26.2 wt % of maleic anhydride, corresponding to 16.6 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 54.0 g of the monomer mixture (26.2 wt % of maleic anhydride in solution in propylene oxide) were metered in via an HPLC pump (1 ml/min), the $CO_2$ pressure being held constant at 15 bar. The reaction mixture was subsequently stirred at 100° C. for 2 hours more. The reaction was halted by cooling of the reactor with ice-water.

The resulting mixture was free from the propylene oxide ($R''_{PO}=0\%$) and maleic anhydride ($M_{MA}=0\%$) monomers used.

| Selectivity | g/e | 0.02 |
|---|---|---|
|  | e/f | 0.52 |
| $C''_{carbonate}$ in % |  | 29.8 |
| $B_{double\ bond}$ in % |  | 12.8 |
| Molecular weight $M_n$ in g/mol |  | 4955 |
| Polydispersity |  | 2.1 |
| OH number in $mg_{KOH}/g$ |  | 25.6 |
| Viscosity in mPa · s |  | 29 200 |
| Glass transition temperature in ° C. |  | 35.14 |

Example 1: Block Terpolymer, Obtained by Terpolymerization of a Mixture of Propylene Oxide, 4.1 Mol % Maleic Anhydride and $CO_2$, Followed by a Terpolymerization of a Mixture of Propylene Oxide, 4.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (6.5 wt % of maleic anhydride, corresponding to 4.1 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 23.9 g of the monomer mixture (6.5 wt % of maleic anhydride in solution in propylene oxide) were metered in via an HPLC pump (I ml/min), the $CO_2$ pressure being held constant at 15 bar. Following the addition of monomer mixture (6.5 wt % of maleic anhydride in solution in propylene oxide), 30 g of a second monomer mixture (8.2 wt % of allyl glycidyl ether, corresponding to 4.3 mol %, in solution in propylene oxide) were metered in via an HPLC pump (1 ml/min), with the $CO_2$ pressure being held constant at 15 bar. The reaction mixture was subsequently stirred at 100° C. for 2 hours more. The reaction was halted by cooling of the reactor with ice-water.

The resulting mixture was free from the monomers used: propylene oxide ($R'''_{PO}=0\%$), allyl glycidyl ether ($R'_{AGE}=0\%$), and maleic anhydride ($R'_{MA}=0\%$).

| Selectivity | g/e | 0.04 |
|---|---|---|
|  | e/f | 0.48 |
| $C'''_{carbonate}$ in % |  | 36.3 |
| $A'_{double\ bond}$ in % |  | 1.8 |
| $B'_{double\ bond}$ in % |  | 1.2 |
| Molecular weight $M_n$ in g/mol |  | 5225 |
| Polydispersity |  | 1.4 |
| OH number in $mg_{KOH}/g$ |  | 24.8 |
| Viscosity in mPa · s |  | 22 000 |
| Glass transition temperature in ° C. |  | 43.1 |

Example 2: Block Terpolymer, Obtained by Terpolymerization of a Mixture of Propylene Oxide, 8.4 Mol % Maleic Anhydride and $CO_2$, Followed by a Terpolymerization of a Mixture of Propylene Oxide, 8.3 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (13.3 wt % of maleic anhydride, corresponding to 8.4 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 24.0 g of the monomer mixture (13.3 wt % of maleic anhydride in solution in propylene oxide) were metered in via an HPLC pump (1 ml/min), the $CO_2$ pressure being held constant at 15 bar. Following the addition of monomer mixture (13.3 wt % of maleic anhydride in solution in propylene oxide), 30 g of a second monomer mixture (15.2 wt % of allyl glycidyl ether, corresponding to 8.3 mol %, in solution in propylene oxide) were metered in via an HPLC pump (1 ml/min), with the $CO_2$ pressure being held constant at 15 bar. The reaction mixture was subsequently stirred at 100° C. for 2 hours more. The reaction was halted by cooling of the reactor with ice-water.

The resulting mixture was free from the monomers used: propylene oxide ($R'''_{PO}$=0%), allyl glycidyl ether ($R'_{AGE}$=0%), and maleic anhydride ($R'_{MA}$=0%).

| Selectivity | g/e | 0.04 |
|---|---|---|
| | e/f | 0.37 |
| $C'''_{carbonate}$ in % | | 27.2 |
| $A'_{double\ bond}$ in % | | 2.9 |
| $B'_{double\ bond}$ in % | | 3.3 |
| Molecular weight $M_n$ in g/mol | | 5113 |
| Polydispersity | | 1.8 |
| OH number in $mg_{KOH}$/g | | 25.0 |
| Viscosity in mPa · s | | 19 100 |
| Glass transition temperature in ° C. | | 45.2 |

Example 3: Block Terpolymer, Obtained by Terpolymerization of a Mixture of Propylene Oxide, 16.6 Mol % Maleic Anhydride and $CO_2$, Followed by a Terpolymerization of a Mixture of Propylene Oxide, 16.4 Mol % Allyl Glycidyl Ether and $CO_2$

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

Following injection of 15 bar of $CO_2$, at which a slight drop in temperature was observed, and following re-establishment of a temperature of 130° C., 2.0 g of a monomer mixture (26.2 wt % of maleic anhydride, corresponding to 16.6 mol %, in solution in propylene oxide) were metered in by means of an HPLC pump (1 ml/min). The reaction mixture was stirred (800 rpm) at 130° C. for 20 min. The addition of 2.0 g of the monomer mixture was repeated a second and third time.

[Polymerization Stage]

After cooling to 100° C. had taken place, a further 23.8 g of the monomer mixture (26.2 wt % of maleic anhydride in solution in propylene oxide) were metered in via an HPLC pump (1 ml/min), the $CO_2$ pressure being held constant at 15 bar. Following the addition of monomer mixture (26.2 wt % of maleic anhydride in solution in propylene oxide), 30 g of a second monomer mixture (30.4 wt % of allyl glycidyl ether [corresponding to 16.4 mol %] in solution in propylene oxide) were metered in using an HPLC pump (1 ml/min), the $CO_2$ pressure being kept constant at 15 bar. The reaction mixture was subsequently stirred at 100° C. for 2 hours more. The reaction was halted by cooling of the reactor with ice-water.

The resulting mixture was free from the monomers used: propylene oxide ($R'''_{PO}$=0%), allyl glycidyl ether ($R'_{AGE}$=0%), and maleic anhydride ($R'_{MA}$=0%).

| Selectivity | g/e | 0.04 |
|---|---|---|
| | e/f | 0.56 |
| $C'''_{carbonate}$ in % | | 36.3 |
| $A'_{double\ bond}$ in % | | 6.9 |
| $B'_{double\ bond}$ in % | | 7.2 |
| Molecular weight $M_n$ in g/mol | | 4340 |
| Polydispersity | | 3.4 |
| OH number in $mg_{KOH}$/g | | 24.3 |
| Viscosity in mPa · s | | 17 000 |
| Glass transition temperature in ° C. | | 47.4 |

Example 4 (Comparative): Copolymerization of Propylene Oxide and $CO_2$ without Addition of Allyl Glycidyl Ether or Maleic Anhydride

[First Activation Stage]

A 300 ml pressure reactor equipped with a gas introduction stirrer was charged with a mixture of DMC catalyst (16 mg) and PET-1 (20 g) and this initial charge was stirred at 130° C. for 30 minutes under a partial vacuum (50 mbar), with argon being passed through the reaction mixture.

[Second Activation Stage]

After injection of $CO_2$ to 15 bar, in the course of which a slight drop in temperature was observed, and re-attainment of a temperature of 130° C., 2.0 g of propylene oxide were metered in with the aid of an HPLC pump (1 ml/min). The reaction mixture was stirred (800 rpm) at 130° C. for 20 min. The addition of 2.0 g of propylene oxide was repeated a second and third time.

[Polymerization Stage]

After cooling to 100° C., a further 54.0 g of propylene oxide were metered in using an HPLC pump (1 ml/min), in the course of which the $CO_2$ pressure was kept constant at 15 bar. The reaction mixture was subsequently stirred at 100° C. for 2 hours more. The reaction was halted by cooling of the reactor with ice-water.

The resulting mixture was free from propylene oxide ($R_{PO}$=0%).

| | | |
|---|---|---|
| Selectivity | g/e | 0.09 |
| | e/f | 0.26 |
| $C_{carbonate}$ in % | | 20.7 |
| Molecular weight $M_n$ in g/mol | | 5495 |
| Polydispersity | | 1.4 |
| OH number in $mg_{KOH}$/g | | 26.2 |
| Viscosity in mPa · s | | 7900 |
| Glass transition temperature in ° C. | | 54.4 |

General Protocol for Radical Crosslinking of the Polyethercarbonate Polyols Containing Electron-Poor and Electron-Rich Double Bonds with Redox Initiation A sample of polyethercarbonate polyol (2 g of one of terpolymers 1-1 to 1-6 or of one of the block terpolymers from example 1-3) was dissolved in methylene chloride and the solution was admixed with benzoyl peroxide (10 mol %, based on the double bonds present in the polyethercarbonate polyol. The methylene chloride was subsequently removed on a rotary evaporator.

A further sample of polyethercarbonate polyol (2 g) was dissolved in methylene chloride and the solution was admixed with 4-dimethylaminobenzoic ether ester (10 mol %, based on the double bonds present in the polyethercarbonate polyol. The methylene chloride was subsequently removed on a rotary evaporator.

The radical crosslinking was carried out on a Physica MCR 501 rheometer from Anton Paar, equipped with a D-PP15 measuring system (plate/plate configuration with a plate spacing of 1 mm). A sample (0.2 g) of each of the polyethercarbonate polyols admixed with benzoyl peroxide and those admixed with ethyl 4-dimethylaminobenzoate was mixed on the rheometer plate of the rheometer and subjected to 10% shearing at 60° C. with a dynamic oscillation of 1 Hz. The storage modulus and loss modulus were measured at 10 second intervals over 60 minutes. The gel point selected was the point in time at which storage modulus (G') and loss modulus (G") are of the same of magnitude (G'/G"=1).

Example 5: Mixture of Terpolymer, Electron-Rich, 13.6 Mol % AGE+Terpolymer, Electron-Poor, 12.8 Mol % MA 0.2 g of the terpolymer 1-3 containing ethyl 4-dimethylaminobenzoate was mixed with 0.2 g of the benzoyl peroxide-containing terpolymer 2-3.

Example 6 (Comparative): Terpolymer, Electron-Rich, 13.6 Mol % AGE 0.4 g of terpolymer 1-3 containing ethyl 4-dimethylaminobenzoate was used.

Example 7 (Comparative): Terpolymer, Electron-Poor, 12.8 Mol % MA 0.4 g of terpolymer 2-3 is used.

TABLE 1

Results of the redox initiation of polyethercarbonate polyol mixtures

| Example | System | Type of double bonds | Average density of double bonds | Time to reach the gel point |
|---|---|---|---|---|
| 5 | Mixture | Electron-rich + Electron-poor | 12 mol % | 20 min |
| 6 (comp.) | Terpolymer | Electron-rich | 12 mol % | >60 min |
| 7 (comp.) | Terpolymer | Electron-poor | 12 mol % | >60 min |

(comp.) comparative example

Examples 5-7 show that a radical crosslinking of a mixture of polyethercarbonate polyols having electron-poor and electron-rich double bonds requires a shorter time until the mixture is fully cured (a shorter time until the gel point is reached) than the crosslinking of polyethercarbonate polyols containing only electron-rich or only electron-poor double bonds.

Example 8: Block Terpolymer, Electron-Rich (6.9 Mol % AGE) and Electron-Poor (7.2 Mol % MA) Double Bonds in One Molecule 0.4 g of the polyethercarbonate polyol according to example 3 was used.

Example 9 (Comparative): Terpolymer, Electron-Rich 6.4 Mol % AGE 0.4 g of terpolymer 1-2 was used.

Example 10 (Comparative): Terpolymer, Electron-Poor, 6.1 Mol % MA 0.4 g of terpolymer 2-2 was used.

TABLE 2

Results of the redox initiation on (block) terpolymer polyethercarbonate polyols

| Example | System | Type of double bonds | Average density of double bonds | Time taken to reach the gel point |
|---|---|---|---|---|
| 8 | Block terpolymer | Electron-rich + electron-poor | 6 mol % | 5 min |
| 9 (comp.) | Terpolymer | Electron-rich + electron-rich | 6 mol % | >60 min |
| 10 (comp.) | Terpolymer | Electron-poor + electron-poor | 6 mol % | >60 min |

(comp.) comparative example

Examples 8-10 show that radical crosslinking of polyethercarbonate polyols having electron-poor and electron-rich double bonds within one molecule necessitates a shorter time to fully cure (shorter time until the gel point is reached) than the crosslinking of polyethercarbonate polyols having only electron-rich or only electron-poor double bonds within one molecule.

General Protocol for the Radical Crosslinking of Polyethercarbonate Polyols Containing Electron-Poor and Electron-Rich Double Bonds Under UV Irradiation.

The crosslinking with UV irradiation was carried out on a Physica MCR 501 rheometer from Anton Paar, equipped with a D-PP15 measuring system (plate/plate configuration with a plate spacing of 1 mm). A sample (0.4 g) of each of the polyethercarbonate polyols admixed with benzoyl peroxide was mixed on the rheometer plate of the rheometer, and subjected to 10% shearing at 25° C. with a dynamic oscillation of 1 Hz. At the same time the sample was subject to UV irradiation with a intensity of 22.7 W/cm². The radiation source used was an Omnicure Series 1000 mercury lamp from Lumen Dynamics with a power of 100 W. 320-500 nm was selected as filter option. The storage modulus and loss modulus were measured over 60 minutes at 10-second intervals. In the case of reaction times of less than 2 minutes, the storage modulus and loss modulus were measured four times per second. The gel point selected was the point in time at which storage modulus (G') and loss modulus (G") are equal in magnitude (G'/G"=1).

Example 11: Mixture of Terpolymer, Electron-Rich, 2.6 Mol % AGE+Terpolymer, Electron-Poor, 2.7 Mol % MA 0.2 g of the benzoyl peroxide-containing terpolymer 1-1 was mixed with 0.2 g of the benzoyl peroxide-containing terpolymer 2-1.

Example 12: Mixture of Terpolymer, Electron-Rich, 6.4 Mol % AGE+Terpolymer, Electron-Poor, 6.1 Mol % MA 0.2 g of the benzoyl peroxide-containing terpolymer 1-2 was mixed with 0.2 g of the benzoyl peroxide-containing terpolymer 2-2.

Example 13: Mixture of Terpolymer, Electron-Rich, 13.6 Mol % AGE+Terpolymer, Electron-Poor, 12.8 Mol % MA 0.2 g of the benzoyl peroxide-containing terpolymer 1-3 was mixed with 0.2 g of the benzoyl peroxide-containing terpolymer 2-3.

Example 14: Block Terpolymer, Electron-Rich (1.8 Mol % AGE) and Electron-Poor (1.2 Mol % MA) Double Bonds in One Molecule 0.4 g of the benzoyl peroxide-containing polyethercarbonate polyol according to example 1 was used.

Example 15: Block Terpolymer, Electron-Rich (2.9 Mol % AGE) and Electron-Poor (3.3 Mol % MA) Double Bonds in One Molecule 0.4 g of the benzoyl peroxide-containing polyethercarbonate polyol according to example 2 was used.

Example 16: Block Terpolymer, Electron-Rich (6.9 Mol % AGE) and Electron-Poor (7.2 Mol % MA) Double Bonds in One Molecule 0.4 g of the benzoyl peroxide-containing polyethercarbonate polyol according to example 3 was used.

Example 17 (Comparative): Terpolymer, Electron-Rich, 13.6 Mol % AGE 0.4 g of the benzoyl peroxide-containing terpolymer 1-3 was used.

Example 18 (Comparative): Terpolymer, Electron-Poor, 12.8 Mol % MA 0.4 g of the benzoyl peroxide-containing terpolymer 2-3 was used.

Example 19 (Comparative): Copolymer, without Double Bonds 0.4 g of the benzoyl peroxide-containing polyethercarbonate polyol according to example 4 was used.

TABLE 3

Results of UV-initiated radical crosslinking

| Example | System | Type of double bonds | Average density Double bonds | Time taken to reach the gel point |
|---|---|---|---|---|
| 11 | Mixture | Electron-rich + electron-poor | 3 mol % | 8.5 min |
| 12 | Mixture | Electron-rich + electron-poor | 6 mol % | 5.9 min |
| 13 | Mixture | Electron-rich + electron-poor | 12 mol % | 3.9 min |
| 14 | Block terpolymer | Electron-rich + electron-poor | 3 mol % | 7.3 min |
| 15 | Block terpolymer | Electron-rich + electron-poor | 6 mol % | 2.9 min |
| 16 | Block terpolymer | Electron-rich + electron-poor | 12 mol % | 1.0 min |
| 17 (comp.) | Terpolymer | Electron-rich | 12 mol % | >60 min |
| 18 (comp.) | Terpolymer | Electron-poor | 12 mol % | >60 min |
| 19 (comp.) | Copolymer | Without double bonds | — | >60 min | comp. comparative example

The table shows that terpolymers containing only electron-rich or electron-poor double bonds cure poorly. The mixtures of electron-poor and electron-rich polymers feature short times through to full cure (short times until the gel point is reached), while block copolymers containing electron-poor and electron-rich double bonds display particularly short times through to full cure (particularly short times until the gel point is reached).

The invention claimed is:

1. A process for preparing polyethercarbonate polyols, the polyethercarbonate polyols comprising double bonds, comprising the steps of:
   (α) initially introducing a catalyst and
   (αα) a suspension medium which contains no H-functional groups and/or
   (αβ) an H-functional starter compound
   (γ) metering in carbon dioxide, an epoxide which contains no unsaturated group, and at least two unsaturated compounds,
   wherein
   the unsaturated compounds metered in step (γ) are selected from unsaturated epoxides and/or unsaturated cyclic anhydrides, and
   (γ1) one of the unsaturated compounds comprises a double bond comprising at least one substituent selected from the group of -OX$^1$, —OCOX$^1$, —X$^1$, —CH$_2$OX$^1$ and/or —CH=CHX$^1$, where X$^1$ in each case is substituted or unsubstituted alkyl, substituted or unsubstituted cycloalkyl, substituted or unsubstituted aryl or a substituted or unsubstituted methylene chain;

(γ2) and another of the unsaturated compounds comprises a double bond comprising at least one substituent selected from the group of —F, —Cl, —Br, —I, —COH, COX$^2$, —COOX$^2$, —C≡N and/or —NO$_2$ or is an unsaturated, substituted or unsubstituted cyclic anhydride of an organic dicarboxylic acid, where X$^2$ in each case is substituted or unsubstituted alkyl, substituted or unsubstituted cycloalkyl, substituted or unsubstituted aryl or a substituted or unsubstituted methylene chain, wherein the molar ratio of the double bonds with substituents as per (γ1) to double bonds with substituents as per (γ2), including structural units in a polymer that originated from cyclic anhydrides, is less than or equal to 3:1 and greater than or equal to 1:3;

and where additionally, if no H-functional starter compound is introduced in step (α), step (γ) comprises the metering in of an H-functional starter compound.

2. The process as claimed in claim 1, further comprising the following step (β) between step (α) and step (γ):

(β) metering in of at least one epoxide.

3. The process as claimed in claim 1, wherein the catalyst is a double metal cyanide catalyst.

4. The process as claimed in claim 1, wherein the unsaturated compound as per (γ2) is an unsaturated cyclic anhydride having a double bond adjacent to a carbonyl group.

5. The process as claimed in claim 1, wherein the unsaturated compound as per (γ2) is an unsaturated epoxide selected from the group of glycidyl esters of α,β-unsaturated acids.

6. The process as claimed in claim 1, wherein the temperature in step (γ) is greater than or equal to 60° C. and less than or equal to 150° C.

7. The process as claimed in claim 1, wherein the unsaturated compound as per (γ1) is selected from the group consisting of allyl glycidyl ether, vinylcyclohexene oxide, cyclooctadiene monoepoxide, cyclododecatriene monoepoxide, butadiene monoepoxide, isoprene monoepoxide, limonene oxide, 1,4-divinylbenzene monoepoxide, 1,3-divinylbenzene monoepoxide, glycidyl esters of unsaturated fatty acids and/or partially epoxidized fats, and oils.

8. The process as claimed in claim 1, wherein the molar ratio is less than or equal to 2:1 and greater than or equal to 1:2.

9. The process as claimed in claim 1, wherein the molar ratio is less than or equal to 1.3:1 and greater than or equal to 1:1.3.

* * * * *